US010850440B2

United States Patent
Buckingham et al.

(10) Patent No.: US 10,850,440 B2
(45) Date of Patent: Dec. 1, 2020

(54) ROOFING, CLADDING OR SIDING PRODUCT

(71) Applicant: Zinniatek Limited, Auckland (NZ)

(72) Inventors: Samuel Gwynn Buckingham, Auckland (NZ); John Wason McKee, Auckland (NZ); Andrew Leo Haynes, Auckland (NZ); James Robert Winton, Auckland (NZ)

(73) Assignee: Zinniatek Limited, Auckland (NZ)

( * ) Notice: Subject to any disclaimer, the term of this patent is extended or adjusted under 35 U.S.C. 154(b) by 0 days.

(21) Appl. No.: 15/531,189

(22) PCT Filed: Dec. 1, 2015

(86) PCT No.: PCT/IB2015/059230
§ 371 (c)(1),
(2) Date: May 26, 2017

(87) PCT Pub. No.: WO2016/088026
PCT Pub. Date: Jun. 9, 2016

(65) Prior Publication Data
US 2017/0362830 A1  Dec. 21, 2017

Related U.S. Application Data

(60) Provisional application No. 62/085,733, filed on Dec. 1, 2014.

(51) Int. Cl.
*E04D 1/22* (2006.01)
*B29C 48/07* (2019.01)
(Continued)

(52) U.S. Cl.
CPC .............. *B29C 48/07* (2019.02); *B29C 41/28* (2013.01); *B29C 41/32* (2013.01); *B29C 48/12* (2019.02);
(Continued)

(58) Field of Classification Search
CPC .... E04D 1/22; E04D 1/16; E04D 1/30; E04D 1/205; E04D 1/34; E04D 1/28;
(Continued)

(56) References Cited

U.S. PATENT DOCUMENTS

| 510,027 A | 12/1893 | Johnson |
| 1,004,338 A | 9/1911 | Austin |

(Continued)

FOREIGN PATENT DOCUMENTS

| CA | 2849258 A1 | 3/2013 |
| CA | 2794345 A1 | 5/2013 |

(Continued)

OTHER PUBLICATIONS

U.S. Appl. No. 15/651,300, filed Jul. 17, 2017, Zinniatek Limited.
(Continued)

*Primary Examiner* — Joshua K Ihezie
(74) *Attorney, Agent, or Firm* — Foley & Lardner LLP

(57) ABSTRACT

This invention relates to a roofing, cladding, or siding module, comprising an underlapping region extending from a head edge of the module and an exposed region extending from a foot edge of the module. The length of the foot edge defining the length of the module. The underlapping region is adapted to be substantially covered by the exposed region of an adjacent or overlapping module when installed on a building surface. The module is formed of at least one layer of extruded material. The layer so formed comprises at least 40% w/w filler and/or reinforcement, and one or more polymer(s).

26 Claims, 16 Drawing Sheets

(51) Int. Cl.
| | | |
|---|---|---|
| *E04F 13/08* | (2006.01) | |
| *E04D 1/26* | (2006.01) | |
| *E04D 1/28* | (2006.01) | |
| *E04D 1/30* | (2006.01) | |
| *B29C 41/28* | (2006.01) | |
| *E04D 1/20* | (2006.01) | |
| *B29C 41/32* | (2006.01) | |
| *E04F 13/16* | (2006.01) | |
| *B29C 48/12* | (2019.01) | |
| *B32B 5/18* | (2006.01) | |
| *B32B 27/06* | (2006.01) | |
| *E04D 1/16* | (2006.01) | |
| *E04D 1/34* | (2006.01) | |
| *B29L 31/10* | (2006.01) | |
| *B29C 48/21* | (2019.01) | |
| *B29C 48/13* | (2019.01) | |
| *B29C 48/00* | (2019.01) | |
| *B29C 48/30* | (2019.01) | |

(52) U.S. Cl.
CPC .............. *B32B 5/18* (2013.01); *B32B 27/06* (2013.01); *E04D 1/16* (2013.01); *E04D 1/20* (2013.01); *E04D 1/205* (2013.01); *E04D 1/22* (2013.01); *E04D 1/265* (2013.01); *E04D 1/28* (2013.01); *E04D 1/30* (2013.01); *E04D 1/34* (2013.01); *E04F 13/0864* (2013.01); *E04F 13/0866* (2013.01); *E04F 13/16* (2013.01); *E04F 13/165* (2013.01); *B29C 48/0014* (2019.02); *B29C 48/13* (2019.02); *B29C 48/21* (2019.02); *B29C 48/303* (2019.02); *B29L 2031/104* (2013.01); *B29L 2031/108* (2013.01); *B32B 2266/0214* (2013.01); *B32B 2419/06* (2013.01); *E04D 2001/305* (2013.01); *E04D 2001/3455* (2013.01)

(58) Field of Classification Search
CPC .............. E04D 1/265; E04D 2001/305; E04D 2001/3455; B32B 5/18; B32B 27/06; B32B 2266/0214; B32B 2419/06; E04F 13/0864
USPC .................... 52/71, 518, 519, 537, 558, 560
See application file for complete search history.

(56) References Cited

U.S. PATENT DOCUMENTS

| | | | |
|---|---|---|---|
| 1,266,137 A | 5/1918 | Friedrich | |
| 1,634,126 A | 6/1927 | Tyra | |
| 1,678,333 A | 7/1928 | Figge | |
| 1,741,515 A | 12/1929 | Halprin | |
| 1,941,216 A | 12/1933 | McKeown | |
| 2,149,818 A | 3/1939 | North | |
| 2,260,446 A | 11/1941 | Ormsby | |
| 2,362,236 A | 11/1944 | Bassler | |
| 2,568,603 A | 9/1951 | Anthony | |
| 2,624,298 A | 1/1953 | Farren | |
| 2,680,565 A | 6/1954 | Lof | |
| 2,756,699 A | 7/1956 | Lockwood | |
| 2,766,861 A | 10/1956 | Abramson | |
| 3,058,265 A | 10/1962 | Lapsensohn | |
| 3,223,018 A | 12/1965 | Tucker | |
| 3,332,830 A * | 7/1967 | Tomlinson | B32B 11/10 428/190 |
| 3,357,064 A | 12/1967 | Robert A Munse | |
| 3,661,410 A | 5/1972 | Larson et al. | |
| 4,141,182 A | 2/1979 | McMullen | |
| 4,173,243 A | 11/1979 | Wilde et al. | |
| 4,173,253 A | 11/1979 | Wiegand | |
| 4,201,196 A | 5/1980 | Zani | |
| 4,281,639 A | 8/1981 | Kuronen | |
| 4,288,959 A * | 9/1981 | Murdock | E04D 1/265 52/518 |
| 4,319,437 A | 3/1982 | Murphy | |
| 4,411,117 A | 10/1983 | Bolha | |
| 4,426,823 A | 1/1984 | Kobe | |
| 4,712,351 A | 12/1987 | Kasprzak | |
| 4,956,140 A | 9/1990 | Rolles et al. | |
| 5,053,180 A | 10/1991 | Wang et al. | |
| 5,070,671 A | 12/1991 | Fifield et al. | |
| 5,076,037 A | 12/1991 | Crick et al. | |
| 5,094,058 A * | 3/1992 | Slocum | B29C 43/222 264/173.1 |
| 5,100,274 A | 3/1992 | Hasan et al. | |
| 5,104,770 A | 4/1992 | Usifer et al. | |
| 5,295,339 A * | 3/1994 | Manner | E04D 1/24 52/313 |
| 5,347,785 A | 9/1994 | Terrenzio et al. | |
| 5,437,735 A | 8/1995 | Younan et al. | |
| 5,475,963 A | 12/1995 | Chelednik | |
| 5,487,247 A | 1/1996 | Pigg | |
| 5,615,523 A * | 4/1997 | Wells | E04D 1/20 52/309.1 |
| 5,615,527 A | 4/1997 | Attley | |
| 5,630,305 A * | 5/1997 | Hlasnicek | B29C 45/00 264/220 |
| 5,651,226 A | 7/1997 | Archibald | |
| 5,690,876 A * | 11/1997 | Gallo, Jr. | B29C 59/04 264/151 |
| 5,711,126 A * | 1/1998 | Wells | E04D 1/30 52/309.1 |
| 6,021,611 A | 2/2000 | Wells et al. | |
| 6,061,978 A | 5/2000 | Dinwoodie et al. | |
| 6,145,264 A | 11/2000 | Dallaire | |
| 6,164,034 A * | 12/2000 | Roetheli | E04D 1/085 428/292.4 |
| 6,201,179 B1 | 3/2001 | Dalacu | |
| 6,220,956 B1 | 4/2001 | Kilian et al. | |
| 6,248,271 B1 * | 6/2001 | Graham | B22C 9/06 249/112 |
| 6,856,496 B1 | 2/2005 | Mucci et al. | |
| 6,908,295 B2 | 6/2005 | Thielman et al. | |
| 6,941,706 B2 | 9/2005 | Austin et al. | |
| 7,520,098 B1 | 4/2009 | Martinique et al. | |
| 7,735,287 B2 | 6/2010 | Gaudreau | |
| 8,020,353 B2 | 9/2011 | Gaudreau | |
| 8,100,341 B1 | 1/2012 | Roderick et al. | |
| 8,215,070 B2 | 7/2012 | Railkar et al. | |
| 8,245,475 B1 | 8/2012 | Thomson et al. | |
| 8,307,599 B2 | 11/2012 | Jenkins et al. | |
| 8,333,356 B2 | 12/2012 | Ernst et al. | |
| 8,402,707 B2 | 3/2013 | Mitchell et al. | |
| 8,468,754 B2 | 6/2013 | Railkar et al. | |
| 8,567,601 B2 * | 10/2013 | Turek | E04D 1/30 206/321 |
| 8,713,860 B2 | 5/2014 | Railkar et al. | |
| 8,713,882 B2 | 5/2014 | Kalkanoglu et al. | |
| 8,763,339 B2 | 7/2014 | Bryson et al. | |
| 8,782,967 B2 | 7/2014 | Daniels | |
| 9,182,136 B2 | 11/2015 | Oaten et al. | |
| 9,322,173 B2 * | 4/2016 | Pisani | E04D 1/14 |
| 9,416,540 B2 * | 8/2016 | Allen | E04D 1/20 |
| 9,518,391 B2 | 12/2016 | Haynes et al. | |
| 2001/0022055 A1 | 9/2001 | Zhang | |
| 2002/0037630 A1 | 3/2002 | Agarwal et al. | |
| 2002/0117166 A1 | 8/2002 | Okumura | |
| 2003/0154667 A1 | 8/2003 | Dinwoodie | |
| 2004/0009338 A1 | 1/2004 | Jo et al. | |
| 2004/0020528 A1 | 2/2004 | Patwardhan | |
| 2004/0074156 A1 | 4/2004 | Haynes | |
| 2005/0072091 A1 | 4/2005 | Morris | |
| 2005/0072092 A1 | 4/2005 | Williams | |
| 2005/0178429 A1 | 8/2005 | McCaskill et al. | |
| 2005/0239394 A1 | 10/2005 | O'Hagin et al. | |
| 2005/0262797 A1 | 12/2005 | Davis | |
| 2006/0026908 A1 * | 2/2006 | Gregori | E04D 1/20 52/105 |
| 2006/0080942 A1 | 4/2006 | O'Neill | |

(56) References Cited

U.S. PATENT DOCUMENTS

| | | | |
|---|---|---|---|
| 2007/0039274 A1* | 2/2007 | Harrington, Jr. | E04D 1/26 52/518 |
| 2007/0078191 A1 | 4/2007 | Guhde et al. | |
| 2007/0119109 A1 | 5/2007 | Kuelker | |
| 2007/0144096 A1 | 6/2007 | O'Neal | |
| 2007/0193620 A1 | 8/2007 | Hines et al. | |
| 2007/0266562 A1* | 11/2007 | Friedman | E04D 1/20 29/897.3 |
| 2008/0000174 A1 | 1/2008 | Flaherty et al. | |
| 2008/0000512 A1 | 1/2008 | Flaherty et al. | |
| 2008/0121270 A1 | 5/2008 | Mayer et al. | |
| 2008/0184645 A1 | 8/2008 | Trabue et al. | |
| 2008/0185748 A1* | 8/2008 | Kalkanoglu | B29C 43/305 264/46.6 |
| 2008/0271773 A1 | 11/2008 | Jacobs et al. | |
| 2008/0302030 A1 | 12/2008 | Stancel et al. | |
| 2008/0302031 A1 | 12/2008 | Bressler et al. | |
| 2009/0000222 A1 | 1/2009 | Kalkanoglu et al. | |
| 2009/0215304 A1 | 8/2009 | Faust et al. | |
| 2010/0037548 A1* | 2/2010 | Kalkanoglu | B29C 47/046 52/309.1 |
| 2010/0083602 A1 | 4/2010 | Pollack | |
| 2010/0141042 A1 | 6/2010 | Kesler et al. | |
| 2010/0170169 A1* | 7/2010 | Railkar | E04D 1/26 52/173.3 |
| 2010/0236162 A1 | 9/2010 | Tweedie | |
| 2010/0237709 A1 | 9/2010 | Hall et al. | |
| 2010/0313501 A1 | 12/2010 | Gangemi | |
| 2011/0000535 A1 | 1/2011 | Davidson | |
| 2011/0012430 A1 | 1/2011 | Cheng et al. | |
| 2011/0017282 A1 | 1/2011 | Tas et al. | |
| 2011/0037322 A1 | 2/2011 | Kanno | |
| 2011/0041428 A1 | 2/2011 | Posnansky | |
| 2011/0047894 A1* | 3/2011 | Shadwell | E04D 1/205 52/105 |
| 2011/0214372 A1 | 9/2011 | Mullet et al. | |
| 2011/0277408 A1* | 11/2011 | Turek | E04D 1/30 52/309.15 |
| 2012/0019074 A1 | 1/2012 | Frolov et al. | |
| 2012/0024283 A1 | 2/2012 | Skillman | |
| 2012/0098350 A1 | 4/2012 | Campanella et al. | |
| 2012/0117908 A1* | 5/2012 | Turek | E04D 1/20 52/519 |
| 2012/0149291 A1 | 6/2012 | Roderick et al. | |
| 2013/0095293 A1* | 4/2013 | Boss | E04D 1/20 428/147 |
| 2013/0167463 A1* | 7/2013 | Duve | E04F 13/21 52/390 |
| 2013/0193769 A1 | 8/2013 | Mehta et al. | |
| 2013/0233385 A1 | 9/2013 | Reese et al. | |
| 2013/0255755 A1 | 10/2013 | Chich | |
| 2013/0263534 A1* | 10/2013 | Railkar | E04D 1/26 52/173.3 |
| 2014/0090696 A1 | 4/2014 | Rodrigues et al. | |
| 2014/0090697 A1 | 4/2014 | Rodrigues et al. | |
| 2014/0190921 A1 | 7/2014 | Thomson et al. | |
| 2014/0259998 A1 | 9/2014 | Railkar et al. | |
| 2014/0259999 A1 | 9/2014 | Rodrigues et al. | |
| 2014/0260001 A1* | 9/2014 | Kiik | F24J 2/52 52/173.3 |
| 2014/0265609 A1 | 9/2014 | Rodrigues et al. | |
| 2015/0047285 A1* | 2/2015 | DeJarnette | E04D 1/20 52/560 |
| 2015/0240495 A1* | 8/2015 | Vermilion | E04D 1/00 428/142 |
| 2017/0059184 A1 | 3/2017 | Haynes et al. | |
| 2017/0355392 A1 | 12/2017 | Nagatani et al. | |
| 2018/0123503 A1 | 5/2018 | Haynes et al. | |

FOREIGN PATENT DOCUMENTS

| | | |
|---|---|---|
| CN | 1261417 A | 7/2000 |
| DE | 46673 C | 8/1888 |
| DE | 2002738 A1 | 7/1971 |
| DE | 42 16 171 A1 | 1/1993 |
| DE | 20 2005 002 105 | 6/2005 |
| DE | 10 2010 009 595 | 9/2011 |
| DE | 10 2010 019 815 A1 | 11/2011 |
| EP | 0 436 572 | 11/1995 |
| EP | 2 009 704 | 12/2008 |
| EP | 2 075 389 A2 | 7/2009 |
| EP | 2 256 894 | 12/2010 |
| EP | 2 494 124 | 5/2014 |
| EP | 2 785 930 | 11/2015 |
| EP | 3227507 | 9/2016 |
| EP | 2 547 837 | 4/2017 |
| GB | 2 141 157 | 12/1984 |
| GB | 2 199 860 | 7/1988 |
| GB | 2 344 836 | 8/2002 |
| JP | S54-121515 | 9/1979 |
| JP | S6193750 | 5/1986 |
| JP | S61-169562 A | 7/1986 |
| JP | S63-065240 | 3/1988 |
| JP | S63-165633 | 7/1988 |
| JP | H534623 A | 2/1993 |
| JP | H06-108549 | 4/1994 |
| JP | 06-212742 A | 8/1994 |
| JP | H7217011 | 8/1995 |
| JP | H7218002 | 8/1995 |
| JP | 08-068566 A | 3/1996 |
| JP | 09-032141 A | 2/1997 |
| JP | H960981 | 3/1997 |
| JP | H972618 | 3/1997 |
| JP | H09-275644 A | 10/1997 |
| JP | H11-136540 | 2/1999 |
| JP | 11-006231 A | 3/1999 |
| JP | 2001-295422 A | 10/2001 |
| JP | 2002-235955 | 8/2002 |
| JP | 2003-049509 | 2/2003 |
| JP | 2005-191578 A | 7/2005 |
| JP | 2006-022481 A | 1/2006 |
| JP | 2008-034557 A | 2/2008 |
| JP | 2008-180414 A | 8/2008 |
| JP | 2009-127921 | 6/2009 |
| JP | 2011-041464 | 2/2011 |
| JP | 5118102 | 1/2013 |
| JP | 2015-502726 | 1/2015 |
| JP | 60-060652 B2 | 1/2017 |
| JP | 2018-011504 | 1/2018 |
| KR | 20110128094 | 11/2011 |
| NZ | 715037 | 5/2013 |
| WO | WO-98/57009 | 12/1998 |
| WO | WO 00/23673 A1 | 4/2000 |
| WO | WO-02/093655 | 11/2002 |
| WO | WO-2006/063333 A2 | 6/2006 |
| WO | WO-2007/058548 | 5/2007 |
| WO | WO-2008/070907 A1 | 6/2008 |
| WO | WO-2008/137966 | 11/2008 |
| WO | WO-2010/036980 | 4/2010 |
| WO | WO-2010/150316 | 12/2010 |
| WO | WO-2011/027627 A1 | 3/2011 |
| WO | WO-2011/099109 A1 | 8/2011 |
| WO | WO-2012/021145 | 2/2012 |
| WO | WO-2013/067484 A1 | 5/2013 |
| WO | WO 2013/081477 A1 | 6/2013 |
| WO | WO-2013/112248 | 8/2013 |
| WO | WO-2015/132756 | 9/2015 |

OTHER PUBLICATIONS

Extended European Search Report for European Patent Application No. 12852960.9, dated May 27, 2015, 6 pages.

International Search Report for International Application No. PCT/NZ2012/000221, dated Apr. 3, 2013, 7 pages.

International Search Report regarding PCT/NZ2012/000222, dated Apr. 2, 2013, 7 pages.

Supplementary European Search Report for European Patent Application No. 1285444, dated Oct. 16, 2016, 10 pages.

ASTM D3462, Standard Specification for Asphalt Shingles Made from Glass Felt and Surfaced with Mineral Granules, downloaded Aug. 26, 2018, 4 pps.

(56) References Cited

OTHER PUBLICATIONS

Deck-Armor™ Roof Protection (GAF Corp., Wayne, New Jersey), Updated Jul. 2018, 5 pps.
Extended European Search Report, EP Application No. 15864647.1, dated Jul. 20, 2018, 9 pps.
Examination Report for European Patent App. No. 15866038.1 dated Apr. 18, 2019, 6 pages.

* cited by examiner

ROOFING, CLADDING OR SIDING PRODUCT

FIELD OF THE INVENTION

The present invention relates to roofing, cladding, and/or siding products and assemblies of such products, for installation onto a building surface. The present invention additionally relates to systems and methods of manufacture of roofing, cladding, and/or siding products.

BACKGROUND TO THE INVENTION

There are a variety of known roofing, cladding and/or siding products, each of which have particular appearance and performance characteristics for installing onto building surfaces according to a user's preference. Well-known products include asphalt shingles, slate, tiles, concrete tiles, corrugated profiles, etc.

It would be advantageous to provide an alternative roofing, cladding and/or siding product which provides the same or similar appearance as those products which have been used traditionally, yet which also provide for performance characteristics. In particular, to provide for such alternatives which are capable of being industrially produced in suitable quantities, and/or from alternative materials.

It is an object of the present invention to provide an alternative or a substitute roofing, cladding and/or siding module.

It is an alternative or additional object of the present invention to provide an alternative method of manufacturing roofing, cladding, and/or siding products in a more productive and/or efficient and/or cost-effective manner.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

In a first aspect, the present invention broadly consists in a roofing, cladding, or siding module, comprising:
  an underlapping region extending from a head edge of the module and an exposed region extending from a foot edge of the module, the length of the foot edge defining the length of the module,
  wherein the underlapping region is adapted to be substantially covered by the exposed region of an adjacent or overlapping module when installed on a building surface,
  wherein the module is formed of at least one layer of extruded material, wherein the layer so formed comprises:
    a) at least 40% w/w filler and/or reinforcement,
    b) one or more polymer(s).

In one embodiment, the module comprises a plurality of formed surfaces molded along the length of the module.

In another embodiment, the layer so formed comprises at least 60% w/w filler and/or reinforcement.

In another embodiment, the layer comprises about 60% to about 95% w/w filler and/or reinforcement.

In another embodiment, the layer comprises at least about 5% w/w reinforcement.

In another embodiment, the layer comprises about 5% to about 30% w/w reinforcement.

In another embodiment, the layer comprises at least about 80% filler and at least about 10% reinforcement.

In one embodiment, the layer comprises one or more of the following polymers:
  a) polystyrene (GPPS),
  b) polyethylene terephthalate (PET),
  c) polyester methacrylate (PEM),
  d) high impact polystyrene (HIPS),
  e) acrylonitrile butadiene styrene (ABS),
  f) polyvinyl chloride (PVC),
  g) polyurethanes (PU),
  h) polyethylene (PE), including homopolymer, copolymer, block copolymer and terpolymer forms,
  i) polylactic acid (PLA),
  j) nylon (PA),
  k) acrylics (PMMA),
  l) high density polyethylene (HDPE),
  m) low density polyethylene (LDPE),
  n) linear low density polyethylene (LLDPE),
  o) medium density polyethylene (MDPE),
  p) cross linked polyethylene (PEX),
  q) thermoplastic elastomer (TPE),
  r) thermoplastic polyolefin (TPO),
  s) thermoplastic rubber (TPR),
  t) polypropylene (PP), including homopolymer and copolymer forms,
  u) polybutylene terephthalate (PBT),
  v) styrene-acrylonitrile resin (SAN),
  w) ethylene tetrafluoroethylene (ETFE),
  x) vinyl,
  y) methacrylate copolymers
  z) foamed polymer.

In another embodiment, the filler comprises one or more of the following:
  a) talc,
  b) calcium carbonate,
  c) mica,
  d) silica,
  e) kaolin,
  f) calcium sulphate,
  g) magnesium hydroxide
  h) stabilizers
  i) dolomite.

In another embodiment, the reinforcement comprises one or more non-conductive natural or synthetic fibres.

In another embodiment, the reinforcement comprises one or more of the following:
  a) glass fibres,
  b) glass beads,
  c) glass flakes,
  d) flax,
  e) cellulose,
  f) wood fibres,
  g) wood flour,
  h) cotton,
  i) sawdust,
  j) inorganic fibres,
  k) polymer fibres,
  l) polymer scrim,
  m) polymer knit,
  n) polymer weave,
  o) aramids,
  p) ceramics.

In another embodiment, the layer further comprises one or more of the following:
a) colorants (including but not limited to carbon black, titanium dioxide)
b) flame retardants (including but not limited to magnesium hydroxide, aluminum trihydrate)
e) stabilizers (including but not limited to UV light stabilizers such as hindered amine light stabilizers (HALS), and thermal stabilizers such as phenolics),
f) foaming agents (including but not limited to exothermic, endothermic or gas foaming agents),
g) lubricants
h) biocides (including but not limited to particles of silver, including nano-sized silver particles).

In another embodiment, as a percentage of the total weight of the layer so formed, the filler and/or reinforcement is about 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95% or may be numerical values between each of these.

In another embodiment, the layer comprises at least about 65% w/w filler and/or reinforcement, or at least about 70%, or at least about 75%, or at least about 80%, or at least about 85%, or at least about 90% w/w filler and/or reinforcement.

In another embodiment, the layer comprises about 5% to about 25% w/w reinforcement, or about 5% to about 20%, or about 2% to about 15%, or about 2% to about 12%, or about 2% to about 10%, 2% to about 8%, or about 2% to about 5%.

In another embodiment, as a percentage of the total weight of the layer so formed, the reinforcement is about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30% or may be numerical values between each of these.

In another embodiment, the layer comprises at least about 10%, or at least about 15% or at least about 20%, or at least about 25% w/w reinforcement.

In another embodiment, the layer comprises up to about 30%, or up to about 25%, or up to about 20%, or up to about 15%, or up to about 10% w/w reinforcement.

In another embodiment, the layer comprises at least about 55% filler and at least about 5% reinforcement, or at least about 60% filler and at least about 5% reinforcement, or at least about 65% filler and at least about 5% reinforcement, or at least about 70% filler and at least about 5% reinforcement, or at least about 75% filler and at least about 5% reinforcement, or at least about 80% filler and at least about 5% reinforcement, or at least about 85% filler and at least about 5% reinforcement, or at least about 90% filler and at least about 5% reinforcement, or may be numerical values between each of these.

In another embodiment, the layer comprises at least about 55% filler and at least about 10% reinforcement, or at least about 60% filler and at least about 10% reinforcement, or at least about 65% filler and at least about 10% reinforcement, or at least about 70% filler and at least about 10% reinforcement, or at least about 75% filler and at least about 10% reinforcement, or at least about 80% filler and at least about 10% reinforcement, or at least about 85% filler and at least about 10% reinforcement, or may be numerical values between each of these.

In another embodiment, the layer comprises at least about 55% filler and at least about 15% reinforcement, or at least about 65% filler and at least about 15% reinforcement, or at least about 70% filler and at least about 15% reinforcement, or at least about 75% filler and at least about 15% reinforcement, or at least about 80% filler and at least about 15% reinforcement, or may be numerical values between each of these.

In another embodiment, the layer comprises at least about 61% filler and at least about 20% reinforcement, or at least about 65% filler and at least about 20% reinforcement, or at least about 70% filler and at least about 20% reinforcement, or at least about 75% filler and at least about 20% reinforcement, or may be numerical values between each of these.

In another embodiment, the layer comprises at least about 61% filler and at least about 25% reinforcement, or at least about 65% filler and at least about 25% reinforcement, or at least about 70% filler and at least about 25% reinforcement, or may be numerical values between each of these.

In another embodiment, the filler comprises calcium carbonate.

In another embodiment, the reinforcement comprises or consists of glass fibres.

In another embodiment, at least a portion of a top surface of the exposed region comprise(s) three dimensional surface features, whether as surface relief or surface texturing.

In another embodiment, said portion comprises surface features resembling one of:
a) asphalt shingle,
b) slate,
c) shingles,
d) shakes,
e) concrete tiles,
f) stone chips,
g) weatherboard,
h) thatch,
i) stone,
j) woodgrain,
k) metal (including but not limited to copper tiles or roofing shingles).

In another embodiment, the surface features are, at least in part, due to coloring, patterning, surface cracking or polymer fracturing or other two-dimensional or three-dimensional ornamentation of said portion.

In another embodiment, the surface features further comprise three-dimensional features including one or more of:
a) surface texturing,
b) surface relief,
c) other three-dimensional pattern or ornamentation configured or arranged to simulate a natural or manufactured material.

In another embodiment, each of the formed surfaces comprises said surface features.

In another embodiment, the roofing, cladding, or siding module further comprises a plurality of formed surfaces, wherein each of the formed surfaces comprises said surface features, and wherein the formed surfaces are joined without weld lines, attachments or injection molding points.

In another embodiment, each formed surface is a molded segment along the length of the module.

In another embodiment, each formed surface comprises an underlapping region and an exposed region, wherein the underlapping region is adapted to be substantially covered by the exposed region of an adjacent or overlapping module when installed on a building surface.

In another embodiment, each formed surface resembles an individual tile or shingle or slate or shake within the module.

In another embodiment, each formed surface resembles a set of tiles or shingles or slates or shakes within the module.

In another embodiment, the module is subsequently sectioned (or divided or partitioned) to provide a plurality of smaller module sections for installation onto a building surface.

In another embodiment, each smaller module section resembles an individual tile or shingle or slate or shake.

In another embodiment, each smaller module section resembles a set, or one or more of, said tiles or shingles or slates or shakes within the section.

In another embodiment, said underlapping region is formed of at least one of said layers so formed of a said extruded material.

In another embodiment, the module comprises a single layer so formed of a said extruded material.

In another embodiment, said layer so formed of a said extruded material is provided as a base or bottom layer of the module, and the module further comprises one or more additional upper layers provided as further layers upon said base or bottom layer.

In another embodiment, said one or more upper layer(s) is formed of an extruded material, said one or more upper layer(s) comprising a different weight percentage of filler and/or reinforcement relative to the base or bottom layer.

In another embodiment, the module comprises of at least three layers, at least one of said layers formed of said extruded material, alternatively two or more of said layers so formed are of a said extruded material, alternatively three or more of said layers so formed are of a said extruded material, alternatively all of the layers of said module are so formed of a said extruded material, whether the layers of the same or different make-up of filler and/or reinforcement, and said one or more polymers.

In another embodiment, the module comprises a base layer, an intermediate layer and a top layer, the intermediate layer and the top layer being upper layers to a base or bottom layer of the module.

In another embodiment, layers are co-extruded to form the or at least a part of said module.

In another embodiment, layers are joined together in a continuous forming process to form the or at least a part of said module.

In another embodiment, the substantially an entire module is formed by arrangement together of said layer(s) of extruded material.

In another embodiment, the module is at least about 0.5 m long.

In another embodiment, the module is at least about 36 inches long.

In another embodiment, the module is at least about 1 m long, or at least about 1.5 m long, or at least about 2 m long, or at least about 2.5 m long, or at least 3 m long.

In another embodiment, the module is about 0.3 mm or about 12 inches wide.

In another embodiment, the module is about 0.5 m wide, or is about 0.8 m wide, or is about 1 m wide.

In another embodiment, at least one layer, such as a base or bottom layer of said module, has a coefficient of thermal expansion of less than about $30 \cdot 10^{-6}$ m/(m K).

In another embodiment, the coefficient of thermal expansion of the module is less than about $30 \cdot 10^{-6}$ m/(m K).

In another embodiment, at least a portion of the module comprises a top layer (or an upper layer or a plurality of upper layers forming a said top layer), a base or bottom layer (or a lower layer or a plurality of lower layers forming a said base or bottom layer), and an intermediate layer (or a plurality of layers forming a said intermediate layer) between the top and base or bottom layers.

In another embodiment, one or more property/properties of one or more of said top layer, intermediate layer and base or bottom layer varies along the length and/or width of the layer.

In another embodiment, one or more property/properties of said top layer is/are different from corresponding one or more property/properties of said intermediate layer and/or base or bottom layer(s).

In another embodiment, one or more property/properties said intermediate layer is/are different from corresponding one or more property/properties of said top layer and/or base or bottom layer(s).

In another embodiment, one or more property/properties said base or bottom layer is/are different from corresponding one or more property/properties of said top layer and/or intermediate layer(s).

In another embodiment, said property/properties comprise(s) one or more of:
a) thickness,
b) surface area
c) tensile strength
d) shear strength
e) resilience
f) elasticity
g) flexibility
h) toughness
i) fire resistance
j) water resistance
k) continuity or uniformity
l) impact resistance
m) resistance to pull through
n) fixing capability
o) chemical resistance
p) puncture resistance
q) content of filler and/or reinforcement
r) concentration of filler and/or reinforcement,
s) color
t) microbial resistance
u) temperature resistance
v) light/heat absorption/reflectivity,
w) thermal transfer.

In another embodiment, a layer extends across at least a part of the width and/or at least a part of the length of the module to provide for a variation to one or more properties to the module so formed by the at least one layer, the properties selected from one or more of those properties listed above.

In another embodiment, the intermediate layer is a reinforcing layer.

In another embodiment, the intermediate layer is one or more of:
a) a film,
b) a sheet,
c) a mesh,
d) a scrim,
e) a weave,
f) a fibre,
g) a fabric,
h) a wire,
i) a string,
j) a web.

In another embodiment, the intermediate reinforcing layer provides for one or more of:
a) resistance against shrinkage,
b) resistance against warping,
c) resistance against tearing,
d) increased toughness, e) prevention against unwanted deflections of the module,
f) weather resistance,
g) resistance against delamination of the layers,
h) reduced flammability,
i) water resistance,
j) impact resistance,
k) resistance to pull through,
l) fixing capability,
m) chemical resistance,
n) puncture resistance,
o) sealing
p) shape memory
q) adhesive/gluing/bonding capability.

In another embodiment, the intermediate layer is chemically and/or mechanically bonded, welded, fused, co-extruded and/or connected to the top layer and/or the base or bottom layer.

In another embodiment, the intermediate layer comprises one or more surface treatment(s).

In another embodiment, the intermediate layer is both chemically and mechanically bonded, welded, fused, co-extruded and/or connected to the top layer and/or the base or bottom layer.

In another embodiment, the intermediate layer comprises one or more of the following three-dimensional surface features to increase or improve the mechanical bond or connection with the top and/or base or bottom layers:
a) surface texturing,
b) surface roughness,
c) projections,
d) corrugations,
e) reinforcements,
f) chemical coating(s),
g) protrusions,
h) apertures,
i) perforations.

In another embodiment, the intermediate layer, when being joined to the top and base or bottom layers, is in a molten or semi-molten or cold but pliable state.

In another embodiment, the module is shaped and/or contoured during the joining or lamination process, while the intermediate layer is in a molten or semi-molten or cold but pliable state or a formable or moldable condition.

In another embodiment, the top and base or bottom layers substantially thermally insulate the intermediate layer, so that the intermediate layer remains, or maintains the condition of being, molten or semi-molten or pliable during the forming process.

In another embodiment, the module is shaped and/or contoured via a casting, thermoforming, pressing or other forming process, whether continuous or discontinuous.

In another embodiment, the property/properties of the intermediate layer is/are varied by deforming the layer when in said molten or semi-molten or cold but pliable state or formable or moldable condition.

In another embodiment, all three layers are in a molten or semi-molten or cold but pliable state or formable or moldable condition when joined together.

In another embodiment, the material for each of the layers is chosen to have a melt flow index and/or heat capacity sufficiently high such that the layers remain molten or semi-molten or pliable while the module is formed.

In another embodiment, the layers are processed at a sufficiently high temperature such that the layers remain molten or semi-molten or pliable while the module is formed.

In another embodiment, the intermediate layer provides a substantially water or liquid resistant barrier, or a water or liquid impermeable barrier between the top and base or bottom layers.

In another embodiment, the top layer and/or base or bottom layer is porous.

In another embodiment, the top layer and/or base or bottom layer is porous due to fracturing of said layer to provide surface ornamentation.

In another embodiment, at least the top layer comprises sections of non-homogenous and/or non-compatible materials, and wherein the intermediate layer provides a binder layer for binding said non-homogenous and/or non-compatible sections to the intermediate layer.

In another embodiment, the top layer comprises a plurality of discontinuous sections formed of different materials, the materials being non-homogenous or non-compatible with each other, and wherein the discontinuous sections are bound to each other via the intermediate layer.

In another embodiment, at least the top layer has a relatively high UV resistance.

In another embodiment, the module is configured to withstand cyclical variations in temperature of about −40 to about 100 degrees Celsius.

In another embodiment, the layers are joined together to form the module in a batch or continuous forming process.

In another embodiment, the layers are formed and joined together in a batch or continuous forming process.

In another embodiment, the layers are extruded in series from two or more (or preferably three) serially arranged extruders.

In another embodiment, one or more of the top, intermediate and base or bottom layers is/are molded by thermoforming, pressing or other method of forming.

In another embodiment, said one or more property/properties of the intermediate layer is/are optimized preferentially along the direction of the length of the module.

In another embodiment, said one or more property/properties of the intermediate layer is/are optimized preferentially along the direction of the width of the module.

In another embodiment, said portion of the module, comprising the top layer, intermediate layer and base or bottom layer, corresponds to the exposed region.

In another embodiment, said portion of the module, comprising the top layer, intermediate layer and base bottom layer, corresponds to the underlapping region.

In another embodiment, the intermediate layer extends from at or adjacent the foot edge, to at or adjacent the underlapping region of the module.

In another embodiment, the roofing, cladding, or siding module further comprises a fastening region adapted to receive one or more fasteners for fixing the module to the or a building surface, preferably the fastening region including a visual guide or boundary markers to allow visual identification of said fastening region.

In another embodiment, the fastening region is substantially adjacent the exposed region and within the underlapping region.

In another embodiment, said portion of the module, comprising the top layer, intermediate layer and base or bottom layer, corresponds to the fastening region.

In another embodiment, said portion of the module, comprising the top layer, intermediate layer and base or bottom layer, corresponds to the exposed region and the fastening region.

In another embodiment, the intermediate layer extends from at or adjacent the foot edge, to within or beyond the fastening region of the module.

In another embodiment, said one or more property/properties of the intermediate layer is/are optimized preferentially within the fastening region.

In another embodiment, the intermediate layer is thicker or comprises thickened regions or other 3-dimensional qualities within the fastening region of the module, preferably the thicker or thickened or other 3-dimensional qualities of the intermediate layer provide for a fastening region capable of retaining a fastener penetrating or pulling through the fastening region or resisting tear of the module by shear force applied to the module or each of the said layers by the fastener.

In another embodiment, the pull through force is at least about 90 N, preferably at least about 100 N.

In another embodiment, said one or more property/properties of the intermediate layer is/are optimized preferentially within the exposed region and fastening region.

In another embodiment, the roofing, cladding, or siding module comprises more than one intermediate layer.

In another embodiment, the roofing, cladding, or siding module comprises discrete intermediate layers in different regions of the module.

In another embodiment, the roofing, cladding, or siding module comprises different intermediate layers in different regions of the module.

In another embodiment, the roofing, cladding, or siding module comprises multiple intermediate layers in one or more regions of the module.

In another embodiment, the top layer is about 0.1 mm to about 50 mm thick.

In another embodiment, the top layer is about 0.1 mm to about 10 mm thick.

Preferably, the top layer is about 0.05, 0.1, 0.2, 0.3, 0.4, 0.5, 0.6, 0.7, 0.8, 0.9 mm thick, or may be numerical values between each of these.

In another embodiment, the intermediate layer is about 0.01 mm to about 10 mm thick.

Preferably, the intermediate layer is about 0.05, 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, or 9.5 mm thick, or may be numerical values between each of these.

In another embodiment, the bottom layer is about 0.1 mm to about 50 mm thick.

In another embodiment, the bottom layer is about 0.1 mm to about 10 mm thick.

Preferably, the bottom layer is about 0.5, 1, 2, 3, 4, 5, 6, 7, 8, 9 mm thick, or may be numerical values between each of these.

In another embodiment, each or all of the layers comprise(s) one or more crystalline polymer(s).

In another embodiment, each or all of the layers comprise(s) one or more amorphous polymer(s).

In another embodiment, the top and bottom layers are made of, or comprise, one or more polymer(s) having a higher degree of crystallinity compared to one or more polymer(s) of the intermediate layer.

In another embodiment, the top and bottom layers are made of, or comprise, one or more polymer(s) having a lower degree of crystallinity compared to one or more polymer(s) of the intermediate layer.

In another embodiment, the top and/or bottom layer is made of, or comprises, thermoplastic polyolefin (TPO).

In another embodiment, the intermediate layer is made of, or comprises, homopolymer or copolymer polypropylene (PP).

In another embodiment, the bottom layer and/or intermediate layer is/are foamed.

In another embodiment, the module is post-treated after being formed.

In another embodiment, the post-treatment may comprise one or more of:
a) shaping,
b) folding,
c) coloring,
d) corrugating,
e) adding surface treatment(s),
f) perforating,
g) laminating,
h) coating.

In another embodiment, the module, once formed, is shaped and/or cut and/or folded into:
a) a ridge tile,
b) a hip tile,
c) a barge tile,
d) an apex tile,
e) other shape such as a corrugated tile.

In another embodiment, the under surface (e.g. a surface of the module to be placed substantially adjacent to or facing of the building surface upon which the module is to be fastened) of the module is substantially flat.

In another embodiment, the under surface of at least the exposed region of the module comprises a plurality of projections.

In another embodiment, the projections provide surfaces for adhering the exposed region of the module to the top surface of the underlapping region of an adjacent or overlapping module when installed.

In another embodiment, the projections provide reinforcement for the module.

In another embodiment, the projections are pre-formed or post-formed from the same material as the under surface of the module.

In another embodiment, the projections are formed from a different material compared to the under surface of the module and incorporated into the module before, during or after forming the module.

In another embodiment, the projections comprise surface features on a bottom surface.

In another embodiment, the surface features are one or more of:
a) corrugations,
b) serrations,
c) projections,
d) ribs,
e) nodes,
f) surface roughness.

In another embodiment, the projections comprise one or more continuous or discontinuous longitudinal ribs extending along the length of the module.

In another embodiment, the projections comprise one or more continuous or discontinuous transverse ribs extending substantially perpendicular to the length of the module.

In another embodiment, the roofing, cladding, or siding module comprises a plurality of longitudinal ribs spaced between 1 and 1000 mm apart from each other.

In another embodiment, the roofing, cladding, or siding module comprises a plurality of longitudinal ribs spaced about 1 mm to about 50 mm apart from each other and extending substantially parallel to each other.

In another embodiment, the height of the, or each, longitudinal rib is about 1 mm to about 100 mm.

In another embodiment, the height of the, or each, longitudinal rib is about 1 mm to about 10 mm.

In another embodiment, the width of the, or each, longitudinal rib is about 1 to about 1000 mm.

In another embodiment, the width of the, or each, longitudinal rib is about 1 mm to about 10 mm.

In another embodiment, the transverse ribs extend from at, or adjacent, the foot edge to, at, or adjacent, the underlapping region.

In another embodiment, the transverse ribs are spaced about 1 mm to about 100 mm apart from each other.

In another embodiment, the transverse ribs are spaced about 1 mm to about 10 mm apart from each other and extend substantially parallel to each other.

In another embodiment, the height of the transverse ribs tapers from at or adjacent the foot edge to, at, or adjacent, the underlapping region.

In another embodiment, the width of each transverse rib is about 1 mm to about 1000 mm.

In another embodiment, the width of each transverse rib is about 1 mm to about 10 mm.

In another embodiment, the projections comprise a plurality of longitudinal ribs and a plurality of transverse ribs extending substantially perpendicular to the ribs.

In another embodiment, the roofing, cladding, or siding module further comprises one or more continuous or discontinuous strips of adhesive on the top surface of the underlapping region of the module (optionally which may be exposed upon removal of a release sheet), configured to contact projections on the under surface of the exposed region of an adjacent or overlapping module when installed.

In another embodiment, the roofing, cladding, or siding module further comprises one or more continuous or discontinuous strips of adhesive on a bottom surface of the projections (optionally which may be exposed upon removal of a release sheet), configured to contact a top surface of an adjacent or underlapping module when installed.

In another embodiment, the module is formed with a convex precamber perpendicular to the length of the module, such that the exposed region is curved downwardly of the underlapping region.

In another embodiment, the convex precamber applies a preload to said exposed region of the module.

In another embodiment, the module is manufactured via a continuous forming process, wherein each of the formed surfaces comprises three dimensional surface features,
  wherein the formed surfaces are molded, discretely or otherwise, along the length of the module,
  wherein the process comprises providing to a continuous forming machine a feed material able to assume and retain a form after being molded between a first forming surface and a second forming surface,
  wherein at least the first forming surface comprises a plurality of die faces provided in sequence and configured to mold the three dimensional surface features,
  wherein each of said formed surfaces is molded by a die face, and
  wherein the number of die faces is offset from the number of formed surfaces in said module.

In another embodiment, there is a greater number of die faces compared to the number of formed surfaces in said module.

In another embodiment, there are fewer die faces compared to the number of formed surfaces in said module.

In another embodiment, there is one excess die face provided along said first forming surface compared to the number of formed surfaces in said module.

In another embodiment, said one excess die face molds the first formed surface of a next module in the continuous forming process.

In another embodiment, each formed surface has three dimensional surface features which are different from the surface features of adjacent formed surfaces.

In another embodiment, each of the formed surfaces within the module has three dimensional surface features which are different from the surface features of any other formed surface within the module.

In another embodiment, the offset number of die faces provides for the module to be formed with a series of formed surfaces which are arranged in a non-identical manner to the series of formed surfaces on at least a previously formed module and/or on a module to be subsequently formed in the continuous forming process.

In another embodiment, the offset number of die faces provides for each module to be formed with a series of formed surfaces which are arranged in a non-identical manner to the series of formed surfaces on a plurality of previously formed modules and on a plurality of modules to be subsequently formed.

In another embodiment, the module comprises seven formed surfaces, and said first forming surface comprises eight die faces.

In another embodiment, each die face may be rotated in place to provide for a different orientation of three dimensional surface features on the formed surface to be molded.

In another embodiment, each die face may be swapped with another die face along said first forming surface.

In another embodiment, at least the or a portion of the top surface of the exposed region is colored or treated in a manner so as to yield a visually observable color, by applying a colored material onto at least a portion of the top surface of the top layer before joining the layers together.

In another embodiment, at least the or a portion of the top surface of the exposed region is colored by applying a colored material onto at least a portion of the top surface of the top layer while the layers are being joined together.

In another embodiment, at least the or a portion of the top surface of the exposed region is colored by applying a colored material onto at least a portion of the top surface of the top layer after the layers have been joined together.

In another embodiment, the colored material once applied to at least a portion of the top surface may form at least a further additional layer of material upon the module. In some examples, the colored material comprises a polymer (or a polymer comprises a colored material) which is then applied to a surface of a layer so formed as a part of the module, and forms an additional layer of the module. For example, the colored material may comprise of a material which may melt when put into contact with the top surface (or may be melted by application of heat or by a thermal transfer process), and the colored material becomes an additional layer of the module. The colored material may become fused or melted into the top surface of the layer to which the colored material is applied, thereby forming a part of the layer to which it was applied.

In another embodiment, the module is formed by molding, and at least a portion of a top surface of the module is a colored and/or decorated and/or textured by applying a colored material onto at least a portion of the top surface of a precursor of the module, wherein the colored material is applied before and/or during and/or after the molding process.

In another embodiment, the precursor is molded between a first forming surface and a second forming surface to form the module, and the colored material is applied to at least a portion of the first forming surface, wherein the colored material is transferred to said portion of the precursor during the molding step.

In another embodiment, the first forming surface comprises at least one die face configured to mold surface features onto at least a portion of a top surface of the module, wherein the colored material is applied to at least a portion of said die face prior to the molding step.

In another embodiment, the colored material is applied directly or indirectly to the precursor and/or the forming surface by one or more of:
  a) stamping,
  b) injecting,
  c) embossing,
  d) spraying,
  e) rolling,
  f) feeding,
  g) brushing,
  h) melting,
  i) immersing,
  j) dipping,
  k) sprinkling,
  l) depositing,
  m) by drawing or suctioning the colored material onto the precursor and/or forming surface using a vacuum system.

In another embodiment, at least a portion of the module comprises a plurality of layers, and the colored material is applied to at least a portion of the top surface of the top-most layer prior to or during a step of joining of the layers to form the module.

In another embodiment, at least the top-most layer is extruded, and the colored material is applied to said portion of the upper surface of the layer as the layer emerges from the extrusion die or an extruder.

In another embodiment, the colored material comprises a powder and/or a fluid capable of being dispersed upon at least the or a portion of the top surface of the exposed region, whether the application is direct or indirect to the surface or whether a die face is used to convey the colored material to the surface.

In another embodiment, the colored material comprises charged particles configured to be attracted to said portion of the top surface of said precursor and/or said first forming surface and/or said second forming surface.

In another embodiment, the colored material comprises charged particles configured to be ejected from a source of such charged particles onto the top surface of the precursor and/or said first forming surface and/or said second forming surface.

In another embodiment, the colored material comprises an adhesive for attaching to said portion of the top surface of said precursor and/or said first forming surface and/or said second forming surface.

In another embodiment, the colored material is applied through a stencil and/or mask, to selectively color one or more portions of said top surface of the precursor and/or said first forming surface and/or said second forming surface.

In another embodiment, the colored material is applied to the module in multiple application steps, being one or more of:
  a) applying a different colored material to said portion of the precursor,
  b) applying a colored material to a different portion of said precursor
  c) applying a colored material through a different stencil or mask.

In another embodiment, the colored material comprises a plurality of components, the components having different melt flow indices.

In another embodiment, the module has at least one surface colored and/or decorated and/or textured by the colored material to resemble one of:
  a) asphalt shingles,
  b) slate,
  c) shingles,
  d) shakes,
  e) concrete tiles,
  f) stone chips,
  g) weatherboard,
  h) thatch,
  i) stone,
  j) woodgrain,
  k) metal.

In another embodiment, at least a portion of a top surface of the module is a colored and/or decorated and/or textured by applying a colored material onto at least a portion of the top surface of the module after the module has been formed by a molding/joining/laminating process.

In another embodiment, the module may comprise further features as described in any one of the following aspects or embodiments.

In a second aspect, the present invention broadly consists in a roofing, cladding, or siding module, comprising:
  an underlapping region extending from a head edge of the module and an exposed region extending from a foot edge of the module, the length of the foot edge defining the length of the module,
  wherein the underlapping region is adapted to be substantially covered by the exposed region of an adjacent or overlapping module when installed on a building surface, and
  wherein at least a portion of the module comprises a top layer (or an upper layer or a plurality of upper layers forming a said top layer), a bottom layer (or a lower layer or a plurality of lower layers forming a said bottom layer), and an intermediate layer (or a plurality of layers forming a said intermediate layer) between the top and bottom layers, and
  wherein one or more property/properties of the intermediate layer varies along the length and/or width of the layer.

In one embodiment, said property/properties comprise(s) one or more of:
  a) thickness,
  b) surface area
  c) tensile strength
  d) shear strength
  e) resilience
  f) elasticity
  g) flexibility
  h) toughness
  i) fire resistance
  j) water resistance
  k) continuity or uniformity l) impact resistance
m) resistance to pull through
n) fixing capability
o) chemical resistance
p) puncture resistance
q) content of filler and/or reinforcement
r) concentration of filler and/or reinforcement
s) color
t) microbial resistance
u) temperature resistance
v) light/heat absorption/reflectivity,
w) thermal transfer
x) shape memory.

In another embodiment, the intermediate layer is a reinforcing layer.

In another embodiment, the intermediate layer is one or more of:
k) a film,
l) a sheet,
m) a mesh,
n) a scrim,
o) a weave,
p) a fibre,
q) a fabric,
r) a wire,
s) a string,
t) a web.

In another embodiment, the intermediate reinforcing layer provides for one or more of:
a) resistance against shrinkage,
b) resistance against warping,
c) resistance against tearing,
d) increased toughness,
e) prevention against unwanted deflections of the module,
f) weather resistance,
g) resistance against delamination of the layers,
h) reduced flammability,
i) water resistance,
j) impact resistance,
k) resistance to pull through,
l) fixing capability,
m) chemical resistance,
n) puncture resistance,
o) sealing
p) shape memory
q) adhesive/gluing/bonding capability.

In another embodiment, the intermediate layer is chemically and/or mechanically bonded, welded, fused, co-extruded and/or connected to the top layer and/or the bottom layer.

In another embodiment, the intermediate layer comprises one or more surface treatment(s), optionally to increase one or more physical properties of the layer (e.g., adhesive capability).

In another embodiment, the intermediate layer is both chemically and mechanically bonded, welded, fused, co-extruded and/or connected to the top layer and/or the bottom layer.

In another embodiment, the intermediate layer comprises one or more of the following three-dimensional surface features to increase the mechanical bond or connection with the top and/or bottom layers:
a) surface texturing,
b) surface roughness,
c) projections,
d) corrugations,
e) reinforcements,
f) chemical coating(s),
g) protrusions,
h) apertures,
i) perforations.

In another embodiment, the intermediate layer, when being joined to the top and bottom layers, is in a molten or semi-molten or cold but pliable state.

In another embodiment, the module is shaped and/or contoured during the joining or lamination process, while the intermediate layer is in a molten or semi-molten or cold but pliable state or a formable or moldable condition.

In another embodiment, the module is shaped and/or contoured via a casting, thermoforming, pressing or other forming process, whether continuous or discontinuous.

In another embodiment, the property/properties of the intermediate layer is/are varied by deforming the layer when in said molten or semi-molten or cold but pliable state or formable or moldable condition.

In another embodiment, all three layers are in a molten or semi-molten or cold but pliable state or formable or moldable condition when joined together.

In another embodiment, the material for each of the layers is chosen to have a melt flow index and/or heat capacity sufficiently high such that the layers remain molten or semi-molten or pliable while the module is formed.

In another embodiment, the layers are processed at a sufficiently high temperature such that the layers remain molten or semi-molten or pliable while the module is formed.

In another embodiment, the layers are joined together to form the module in a batch or continuous forming process.

In another embodiment, the layers are formed and joined together in a batch or continuous forming process.

In another embodiment, one or more of the top, intermediate and bottom layers is/are extruded.

In another embodiment, the layers are co-extruded.

In another embodiment, the layers are extruded in series from two or more (or preferably three) serially arranged extruders.

In another embodiment, one or more of the top, intermediate and bottom layers is/are molded by thermoforming, pressing or other method of forming.

In another embodiment, said one or more property/properties of the intermediate layer is/are optimized preferentially along the direction of the length of the module.

In another embodiment, said one or more property/properties of the intermediate layer is/are optimized preferentially along the direction of the width of the module.

In another embodiment, said portion of the module, comprising the top layer, intermediate layer and bottom layer, corresponds to the exposed region.

In another embodiment, said portion of the module, comprising the top layer, intermediate layer and bottom layer, corresponds to the underlapping region.

In another embodiment, the intermediate layer extends from at or adjacent the foot edge, to at or adjacent the underlapping region of the module.

In another embodiment, the roofing, cladding, or siding module further comprises a fastening region adapted to receive one or more fasteners for fixing the module to the building surface, preferably the fastening region including a visual guide or boundary markers to allow visual identification of said fastening region.

In another embodiment, the fastening region is substantially adjacent the exposed region and within the underlapping region.

In another embodiment, said portion of the module, comprising the top layer, intermediate layer and bottom layer, corresponds to the fastening region.

In another embodiment, said portion of the module, comprising the top layer, intermediate layer and bottom layer, corresponds to the exposed region and the fastening region.

In another embodiment, the intermediate layer extends from at or adjacent the foot edge, to within or beyond the fastening region of the module.

In another embodiment, said one or more property/properties of the intermediate layer is/are optimized preferentially within the fastening region.

In another embodiment, the intermediate layer is thicker or comprises thickened regions or other 3-dimensional qualities within the fastening region of the module, preferably the thicker or thickened or other 3-dimensional qualities of the intermediate layer provide for a fastening region capable of retaining a fastener penetrating or pulling through the fastening region or resisting tear of the module by shear force applied to the module or each of the said layers by the fastener.

In another embodiment, the pull through force is at least about 90 N, preferably at least about 100 N.

In another embodiment, said one or more property/properties of the intermediate layer is/are optimized preferentially within the exposed region and fastening region.

In another embodiment, the roofing, cladding, or siding module comprises more than one intermediate layer.

In another embodiment, the roofing, cladding, or siding module comprises discrete intermediate layers in different regions of the module.

In another embodiment, the roofing, cladding, or siding module comprises different intermediate layers in different regions of the module.

In another embodiment, the roofing, cladding, or siding module comprises multiple intermediate layers in one or more regions of the module.

In another embodiment, the top layer is about 0.1 to about 50 mm thick. In another embodiment, the top layer is about 0.1 to about 10 mm thick. Preferably, the top layer is about 0.05, 0.1, 0.2, 0.3, 0.4, 0.5, 0.6, 0.7, 0.8, 0.9 mm thick, or may be numerical values between each of these.

In another embodiment, the intermediate layer is about 0.01 to about 10 mm thick. Preferably, the intermediate layer is about 0.05, 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, or 9.5 mm thick, or may be numerical values between each of these.

In another embodiment, the bottom layer is about 0.1 to about 50 mm thick. In another embodiment, the bottom layer is about 0.1 to about 10 mm thick. Preferably, the bottom layer is about 0.5, 1, 2, 3, 4, 5, 6, 7, 8, 9 mm thick, or may be numerical values between each of these.

In another embodiment, each or all of the layers comprise(s) one or more crystalline polymer(s).

In another embodiment, each or all of the layers comprise(s) one or more amorphous polymer(s).

In another embodiment, the top and bottom layers are made of, or comprise, one or more polymer(s) having a higher degree of crystallinity compared to one or more polymer(s) of the intermediate layer.

In another embodiment, the top and bottom layers are made of, or comprise, one or more polymer(s) having a lower degree of crystallinity compared to one or more polymer(s) of the intermediate layer.

In another embodiment, one or more of the top layer, intermediate layer and bottom layer is/are made of, or comprise, one or more of the following:
a) polystyrene (GPPS),
b) polyethylene terephthalate (PET),
c) polyester methacrylate (PEM),
d) high impact polystyrene (HIPS),
e) acrylonitrile butadiene styrene (ABS),
f) polyvinyl chloride (PVC),
g) polyurethanes (PU),
h) polyethylene (PE) including homopolymer, copolymer, block copolymer and terpolymer forms,
i) polylactic acid (PLA),
j) nylon (PA),
k) acrylics (PMMA),
l) high density polyethylene (HDPE),
m) low density polyethylene (LDPE),
n) linear low density polyethylene (LLDPE),
o) medium density polyethylene (MDPE),
p) cross linked polyethylene (PEX),
q) thermoplastic elastomer (TPE),
r) thermoplastic polyolefin (TPO),
s) thermoplastic rubber (TPR),
t) polypropylene (PP), including homopolymer and copolymer forms,
u) polybutylene terephthalate (PBT),
v) styrene-acrylonitrile resin (SAN),
w) ethylene tetrafluoroethylene (ETFE),
x) vinyl,
y) methacrylate copolymers
z) foamed polymer.

In another embodiment, the top and/or bottom layer is made of, or comprises, thermoplastic polyolefin (TPO).

In another embodiment, the intermediate layer is made of, or comprises, homopolymer or copolymer polypropylene (PP).

In another embodiment, the bottom layer and/or intermediate layer is/are foamed.

In another embodiment, one or more of the top, intermediate and bottom layers comprise(s) three dimensional surface features, whether as surface relief or surface texturing.

In another embodiment, at least the exposed region of the top layer comprises surface features resembling one of:
a) asphalt shingle,
b) slate,
c) shingles,
d) shakes,
e) concrete tiles,
f) stone chips,
g) weatherboard,
h) thatch,
i) stone,
j) woodgrain,
k) metal.

In another embodiment, the surface features are, at least in part, due to coloring, patterning, surface cracking or polymer fracturing or other two-dimensional or three-dimensional ornamentation of said region.

In another embodiment, the surface features further comprise three-dimensional features including one or more of:
a) surface texturing,
b) surface relief,
c) other three-dimensional pattern or ornamentation configured or arranged to simulate a natural or manufactured material.

In another embodiment, the roofing, cladding, or siding module further comprises a plurality of formed surfaces, wherein each of the formed surfaces comprises said surface features, and wherein the formed surfaces are joined without weld lines, attachments or injection molding points.

In another embodiment, each formed surface is a molded segment along the length of the module.

In another embodiment, each formed surface comprises an underlapping region and an exposed region, wherein the underlapping region is adapted to be substantially covered by the exposed region of an adjacent or overlapping module when installed on a building surface.

In another embodiment, each formed surface resembles an individual tile or shingle or slate or shake within the module.

In another embodiment, each formed surface resembles a set of tiles or shingles or slates or shakes within the module.

In another embodiment, the module is subsequently sectioned (or divided or partitioned) to provide a plurality of smaller module sections for installation onto a building surface.

In another embodiment, each smaller module section resembles an individual tile or shingle or slate or shake.

In another embodiment, each smaller module section resembles a set of tiles or shingles or slates or shakes within the section.

In another embodiment, the module is post-treated after being formed.

In another embodiment, the post-treatment may comprise one or more of:
a) shaping,
b) folding,
c) coloring,
d) corrugating,
e) adding surface treatment(s),
f) perforating,
g) laminating,
h) coating.

In another embodiment, the module, once formed, is shaped and/or cut and/or folded into:
a) a ridge tile,
b) a hip tile,
c) a barge tile,
d) an apex tile,
e) other shape such as a corrugated tile.

In another embodiment, the under surface of the module is substantially flat.

In another embodiment, the under surface of at least the exposed region of the module comprises a plurality of projections.

In another embodiment, the projections provide surfaces for adhering the exposed region of the module to the top surface of the underlapping region of an adjacent or overlapping module when installed.

In another embodiment, the projections provide reinforcement for the module.

In another embodiment, the projections comprise one or more continuous or discontinuous longitudinal ribs extending along the length of the module.

In another embodiment, the projections comprise one or more continuous or discontinuous transverse ribs extending substantially perpendicular to the length of the module.

In another embodiment, the projections are pre-formed or post-formed from the same material as the under surface of the module.

In another embodiment, the projections are formed from a different material compared to the under surface of the module and incorporated into the module before, during or after forming the module.

In another embodiment, the projections comprise surface features on a bottom surface.

In another embodiment, the surface features are one or more of:
a) corrugations,
b) serrations,
c) projections,
d) ribs,
e) nodes,
f) surface roughness.

In another embodiment, the intermediate layer provides a substantially water or liquid resistant barrier, or a water or liquid impermeable barrier between the top and bottom layers.

In another embodiment, at least the top layer comprises sections of non-homogenous and/or non-compatible materials, and wherein the intermediate layer provides a binder layer for binding said non-homogenous and/or non-compatible sections to the intermediate layer.

In another embodiment, the top layer comprises a plurality of discontinuous sections formed of different materials, the materials being non-homogenous or non-compatible with each other, and wherein the discontinuous sections are bound to each other via the intermediate layer.

In another embodiment, one or more of the layers further comprises one or more additives, such as, but not limited to, one or more of the following:
a) fillers (including but not limited to talc, calcium carbonate, mica, silica, kaolin, calcium sulphate, magnesium hydroxide, stabilizers, dolomite)
b) colorants (including but not limited to carbon black, titanium dioxide)
c) reinforcements (including but not limited to glass fibres, glass beads, glass flakes, natural fibres such as flax, cellulose, wood fibres, wood flour, cotton, sawdust, and inorganic or polymer fibres, scrim, knits, weave, non-woven, aramids, ceramics)
d) flame retardants (including but not limited to magnesium hydroxide, aluminum trihydrate)
e) stabilizers (including but not limited to UV light stabilizers such as hindered amine light stabilizers (HALS), and thermal stabilizers such as phenolics),
f) foaming agents (including but not limited to exothermic, endothermic or gas foaming agents),
g) lubricants,
h) biocides (including but not limited to particles of silver, including nano-sized silver particles).

In another embodiment, at least the top layer has a high UV resistance.

In another embodiment, the module is configured to withstand cyclical variations in temperature between −40 and 100 degrees Celsius.

In another embodiment, at least the or a portion of the top surface of the exposed region is colored or treated in a manner so as to yield a visually observable color, by applying a colored material onto at least a portion of the top surface of the top layer before joining the layers together.

In another embodiment, at least the or a portion of the top surface of the exposed region is colored by applying a colored material onto at least a portion of the top surface of the top layer while the layers are being joined together.

In another embodiment, at least the or a portion of the top surface of the exposed region is colored by applying a colored material onto at least a portion of the top surface of the top layer after the layers have been joined together.

In another embodiment, the module may comprise a layer of extruded material as described in the first aspect or associated embodiments.

In a third aspect, the present invention broadly consists in a roofing, cladding, or siding module, comprising:
- an underlapping region extending from a head edge of the module and an exposed region extending from a foot edge of the module,
- wherein the underlapping region is adapted to be substantially covered by the exposed region of an adjacent or overlapping module when installed on a building surface,
- wherein at least a portion of the module comprises a top layer, a bottom layer, and an intermediate layer between the top and bottom layers, and
- wherein the intermediate layer provides a substantially water or liquid resistant barrier, or a water or liquid impermeable barrier between the top and bottom layers.

In one embodiment, the top layer and/or bottom layer is porous.

In another embodiment, the top layer and/or bottom layer is porous due to fracturing of said layer to provide surface ornamentation.

In another embodiment, the intermediate layer extends from at or adjacent the foot edge, to at or adjacent the underlapping region of the module.

In another embodiment, the roofing, cladding, or siding module further comprises a fastening region adapted to receive one or more fasteners for fixing the module to the building surface.

In another embodiment, the fastening region is adjacent the exposed region and within the underlapping region.

In another embodiment, the intermediate layer extends from at or adjacent the foot edge, to beyond the fastening region of the module.

In another embodiment, the intermediate layer extends through and along at least the exposed region of the module.

In another embodiment, the module may comprise further features as described in any one of the preceding or following aspects or embodiments.

In another embodiment, the module may comprise a layer of extruded material as described in the first aspect or associated embodiments.

In a fourth aspect, the present invention broadly consists in a method of manufacture of a roofing, cladding or siding module comprising a plurality of formed surfaces molded, discretely or otherwise, along the length of the module, wherein each of the formed surfaces comprises three dimensional surface features, the method comprising
- providing to a continuous forming machine a feed material able to assume and retain a form after being molded between a first forming surface and a second forming surface,
- wherein at least the first forming surface comprises a plurality of die faces provided in sequence and configured to mold the three dimensional surface features, each of said formed surfaces to be molded by a die face, and
- wherein the number of die faces is either:
  - offset from the number of formed surfaces in each module to be formed, or
  - matches the number of formed surfaces in each module to be formed (for example where the formed surfaces are to be of repeating or matching surfaces).

In one embodiment, there is a greater number of die faces compared to the number of formed surfaces in each module to be formed.

In another embodiment, there are fewer die faces compared to the number of formed surfaces in each module to be formed.

In another embodiment, there is one excess die face provided along said first forming surface compared to the number of formed surfaces in each module to be formed.

In another embodiment, said one excess die face molds the first formed surface of the next module in a continuous forming process.

In another embodiment, each formed surface has three dimensional surface features which are different from the surface features of adjacent formed surfaces.

In another embodiment, each of the formed surfaces within the module has three dimensional surface features which are different from the surface features of any other formed surface within the module.

In another embodiment, the offset number of die faces provides for each module to be formed with a series of formed surfaces which are arranged in a non-identical manner to the series of formed surfaces on at least the previously formed module and/or on the next or a module to be subsequently formed.

In another embodiment, the offset number of die faces provides for each module to be formed with a series of formed surfaces which are arranged in a non-identical manner to the series of formed surfaces on a plurality of previously formed modules and on a plurality of modules to be subsequently formed.

In another embodiment, there are eight die faces along said first forming surface, to mold seven formed surfaces in each module.

In another embodiment, each die face may be rotated in place to provide for a different orientation of three dimensional surface features on the formed surface to be molded.

In another embodiment, each die face may be swapped with another die face along said first forming surface.

In another embodiment, each formed surface resembles an individual tile or shingle or slate or shake within the module.

In another embodiment, the method further comprises a step of sectioning the module once formed, to provide a plurality of smaller module sections for installation onto a building surface.

In another embodiment, the method further comprises post-treating the module once formed.

In another embodiment, the post-treatment may comprise one or more of:
a) shaping,
b) folding,
c) coloring,
d) corrugating,
e) adding surface treatment(s),
f) perforating,
g) laminating,
h) coating.

In another embodiment, the method further comprises shaping and/or cutting and/or folding the module, once formed, into:
a) a ridge tile,
b) a hip tile,
c) a barge tile,
d) an apex tile,
e) other shape such as a corrugated tile.

In another embodiment, the module may comprise further features as described in any one of the preceding or following aspects or embodiments.

In another embodiment, the module may comprise a layer of extruded material as described in the first aspect or associated embodiments.

In a fifth aspect, the present invention broadly consists in a roofing, cladding, or siding module, wherein at least a portion of the module comprises a top layer, a bottom layer and an intermediate layer between the top and bottom layers,
wherein the top and bottom layers are made of, or comprise, one or more polymer(s),
wherein the intermediate layer is made of, or comprise, one or more polymer(s),
wherein said one or more polymer(s) of the top and bottom layers has/have a lower degree of crystallinity compared to said one or more polymer(s) of the intermediate layer, and
wherein each layer is in a molten or semi-molten or pliable state when joined to the adjacent layer to form the module.

In one embodiment, the top and bottom layers are made of, or comprise, one or more amorphous or semi-crystalline polymer(s),
wherein the intermediate layer is made of, or comprise, one or more crystalline or semi-crystalline polymer(s).

In another embodiment, the temperature of the forming process is monitored to control the rheology of each layer such that the layers remain molten or semi-molten or pliable while the module is formed.

In another embodiment, the top and bottom layers substantially thermally insulate the intermediate layer, so that the intermediate layer remains, or maintains the condition of being, molten or semi-molten or pliable during the forming process.

In another embodiment, the intermediate layer is a reinforcing film or sheet.

In another embodiment, one or more of the top, intermediate and bottom layers is/are extruded.

In another embodiment, the layers are co-extruded.

In another embodiment, the layers are extruded in series from an array of serially arranged extruders.

In another embodiment, one or more of the top, intermediate and bottom layers is/are molded by thermoforming, pressing or other method of forming.

In another embodiment, the layers are formed and/or joined together in a continuous forming process.

In another embodiment, the top and/or bottom layers comprise(s) thermoplastic polyolefin (TPO).

In another embodiment, the intermediate layer comprises polypropylene (PP).

In another embodiment, the module may comprise further features as described in any one of the preceding or following aspects or embodiments.

In another embodiment, the module may comprise a layer of extruded material as described in the first aspect or associated embodiments.

In a sixth aspect, the present invention broadly consists in a roofing, cladding, or siding module, comprising:
an underlapping region extending from a head edge of the module and an exposed region extending from a foot edge of the module, the length of the foot edge defining the length of the module,
wherein the exposed region is adapted to substantially cover an underlapping region of an adjacent or overlapping module when installed on a building surface, and
wherein the under surface of the exposed region comprises a plurality of projections, the projections providing surfaces upon which the exposed region of the module may be adhered to the top surface of the underlapping region of an adjacent or overlapping module when installed.

In one embodiment, said module comprises a plurality of formed surfaces molded along the depth of the module, and wherein said module is formed via a continuous forming process such that said formed surfaces are connected to each other without weld lines or attachment points.

In another embodiment, said module comprises one or more layers formed of an extruded material.

In another embodiment, the projections comprise one or more longitudinal ribs extending along the length of the module.

In another embodiment, the roofing, cladding, or siding module comprises a plurality of longitudinal ribs spaced between 1 and 1000 mm apart from each other.

In another embodiment, the roofing, cladding, or siding module comprises a plurality of longitudinal ribs spaced between 1 and 50 mm apart from each other and extending substantially parallel to each other.

In another embodiment, the height of the, or each, longitudinal rib is between 1 and 100 mm.

In another embodiment, the height of the, or each, longitudinal rib is between 1 and 10 mm.

In another embodiment, the width of the, or each, longitudinal rib is between 1 and 1000 mm.

In another embodiment, the width of the, or each, longitudinal rib is between 1 and 10 mm.

In another embodiment, the projections further comprise a plurality of transverse ribs extending substantially perpendicular to the or each longitudinal rib.

In another embodiment, the transverse ribs extend from at, or adjacent, the foot edge to, at, or adjacent, the underlapping region.

In another embodiment, the transverse ribs are spaced between 1 and 100 mm apart from each other.

In another embodiment, the transverse ribs are spaced between 1 and 10 mm apart from each other and extend substantially parallel to each other.

In another embodiment, the height of the transverse ribs tapers from at or adjacent the foot edge to, at, or adjacent, the underlapping region.

In another embodiment, the width of each transverse rib is between 1 and 1000 mm.

In another embodiment, the width of each transverse rib is between 1 and 10 mm.

In another embodiment, the ribs may be continuous or discontinuous or discrete sections or portions of projections, each of the projected portions providing one or more surfaces upon which the exposed region of the module may be adhered to the top surface of the underlapping region of an adjacent or overlapping module when installed.

In another embodiment, the projections are molded into said under surface of the exposed region of the module.

In another embodiment, the projections are pre-formed or post-formed from the same material as the under surface of the module.

In another embodiment, the projections are formed from a different material compared to the under surface of the module and incorporated into the module before, during or after forming the module.

In another embodiment, the projections comprise surface features on a bottom surface.

In another embodiment, the surface features are one or more of:
a) corrugations,
b) serrations,
c) projections,
d) ribs,
e) nodes,
f) surface roughness.

In another embodiment, the projections further reinforce the exposed region of the module.

In another embodiment, the roofing, cladding, or siding module further comprises one or more continuous or discontinuous strips of adhesive on the top surface of the underlapping region of the module (optionally which may be exposed upon removal of a release sheet), configured to contact projections on the under surface of the exposed region of an adjacent or overlapping module when installed.

In another embodiment, the roofing, cladding, or siding module further comprises one or more continuous or discontinuous strips of adhesive on a bottom surface of the projections (optionally which may be exposed upon removal of a release sheet), configured to contact a top surface of an adjacent or underlapping module when installed.

In another embodiment, the module is formed with a convex precamber perpendicular to the length of the module, such that the exposed region is curved downwardly of the underlapping region.

In another embodiment, the convex precamber applies a preload to said exposed region of the module.

In another embodiment, the module may comprise further features as described in any one of the preceding or following aspects or embodiments.

In another embodiment, the module may comprise a layer of extruded material as described in the first aspect or associated embodiments.

In a seventh aspect, the present invention broadly consists in a method of coloring or decorating at least a portion of a top surface of a molded roofing, cladding, or siding module, comprising
applying a colored material onto at least a portion of the top surface of a precursor of the module to be molded, wherein the colored material is applied before and/or during the molding process.

In one embodiment, the method further comprises a step of molding the precursor between a first forming surface and a second forming surface to form the module, wherein the colored material is applied to at least a portion of the first forming surface, and wherein the colored material is transferred to said portion of the precursor during the molding step.

In another embodiment, the first forming surface comprises at least one die face configured to mold surface features onto at least a portion of a top surface of the module, wherein the colored material is applied to at least a portion of said die face prior to the molding step.

In another embodiment, the colored material is applied directly or indirectly to the precursor and/or the forming surface by one or more of:
a) stamping,
b) injecting,
c) embossing,
d) spraying,
e) rolling,
f) feeding,
g) brushing,
h) melting,
i) immersing,
j) dipping,
k) sprinkling,
l) depositing,
m) by drawing or suctioning the colored material onto the precursor and/or forming surface using a vacuum system.

In another embodiment, at least a portion of the module comprises a plurality of layers, and wherein the colored material is applied to at least a portion of the upper surface of the top-most layer prior to or during a step of joining of the layers to form the module. In another embodiment, at least the top-most layer is extruded, and the colored material is applied to said portion of the upper surface of the layer as the layer emerges from the extrusion die or an extruder.

In another embodiment, the colored material comprises a powder and/or a fluid capable of being dispersed upon at least the or a portion of the top surface of the exposed region, whether the application is direct or indirect to the surface or whether a die face is used to convey the colored material to the surface.

In another embodiment, the colored material comprises charged particles configured to be attracted to said portion of the top surface of said precursor and/or said first forming surface and/or said second forming surface.

In another embodiment, the colored material comprises charged particles configured to be ejected from a source of such charged particles onto the top surface of the precursor and/or said first forming surface and/or said second forming surface.

In another embodiment, the colored material comprises an adhesive for attaching to said portion of the top surface of said precursor and/or said first forming surface and/or said second forming surface.

In another embodiment, the colored material is applied through a stencil and/or mask, to selectively color one or more portions of said top surface of the precursor and/or said first forming surface and/or said second forming surface.

In another embodiment, the method further comprises multiple colored material application steps, being one or more of:
a) applying a different colored material to said portion of the precursor,
b) applying a colored material to a different portion of said precursor
c) applying a colored material through a different stencil or mask.

In another embodiment, the colored material comprises a plurality of components, the components having different melt flow indices.

In another embodiment, the output is a roofing, cladding, or siding module having at least one surface colored to resemble one of:
a) asphalt shingles,
b) slate,
c) shingles,
d) shakes,
e) concrete tiles,
f) stone chips,
g) weatherboard,
h) thatch,
i) stone,
j) woodgrain,
k) metal.

In another embodiment, the module comprises an underlapping region extending from a head edge of the module and an exposed region extending from a foot edge of the module, wherein the underlapping region is adapted to be substantially covered by the exposed region of an adjacent or overlapping module when installed on a building surface, and wherein the method comprises coloring the top surface of at least the exposed region of the module.

In another embodiment, the module may comprise further features as described in any one of the preceding or following aspects or embodiments.

In another embodiment, the module may comprise a layer of extruded material as described in the first aspect or associated embodiments.

In an eighth aspect, the present invention broadly consists in a method of coloring at least a portion of a top surface of a molded roofing, cladding, or siding module, comprising applying a colored material onto at least a portion of the top surface of the module after the module has been formed by a molding/joining/laminating process.

In another embodiment, the method may further comprise one or more features as described in the preceding embodiments.

In another embodiment, the module may comprise further features as described in any one of the preceding aspects or embodiments. In another embodiment, the module may comprise a layer of extruded material as described in the first aspect or associated embodiments.

In another aspect, the present invention broadly consists in a layer of extruded material, wherein the layer so formed comprises:

a) at least 40% w/w filler and/or reinforcement,
b) one or more polymer(s).

In one embodiment, the layer may be formed (optionally with additional layers) into a roofing, cladding, or siding module. In further embodiments, the layer so formed may be a layer according to any one of the above aspects.

In another aspect, the present invention broadly consists in a roofing, cladding, or siding module, comprising:

an underlapping region extending from a head edge of the module and an exposed region extending from a foot edge of the module, the length of the foot edge defining the length of the module, wherein the underlapping region is adapted to be substantially covered by the exposed region of an adjacent or overlapping module when installed on a building surface, and wherein at least a portion of the module comprises a top layer (or an upper layer or a plurality of upper layers forming a said top layer), a bottom layer (or a lower layer or a plurality of lower layers forming a said bottom layer), and an intermediate layer (or a plurality of layers forming a said intermediate layer) between the top and bottom layers, and wherein at least one or more of said top layer or said intermediate layer or said base or bottom layer comprises a foamed polymer.

In another aspect, the present invention broadly consists in an assembly for installation on a building surface comprising a plurality of the roofing, cladding, or siding modules of any one of the preceding clauses.

In another aspect, the present invention broadly consists in a building surface clad by a plurality of the roofing, cladding, or siding modules of any one of the preceding clauses.

In another aspect, the present invention broadly consists in a building comprising a surface clad by a plurality of the roofing, cladding, or siding modules of any one of the preceding clauses.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The term "comprising" as used in this specification and claims means "consisting at least in part of". When interpreting each statement in this specification and claims again that includes the term "comprising", features other than that or those prefaced by the term may also be present. Related terms such as "comprise" and "comprises" are to be interpreted in the same manner.

The present technology is described herein using several definitions, as set forth throughout the specification. Unless otherwise stated, the singular forms "a," "an," and "the" include the plural reference. For example, a reference to "a device" includes a plurality of devices.

As used herein the term "and/or" means "and" or "or", or both.

As used herein "(s)" following a noun means the plural and/or singular forms of the noun.

Relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, the term "formed surface" refers to a molded segment of a polymeric material corresponding to an individual die or mold of a continuous forming machine.

As used herein, the term "building surface" refers to a wall surface or a top surface, etc. of a building, e.g. an exterior wall, a roof, a ceiling, etc., unless otherwise specified. In the context of a roof, the building surface typically comprises a waterproof roofing product attached to the roof deck adjacent an eave of the roof for preventing water damage to the roof deck and an interior of a building from wind-blown rain or water buildup on the roof. The roof deck is typically made of an underlying material, such as plywood. The waterproof membrane may be any of a number of waterproof roofing membranes or underlay known in the art such as but not limited to bituminous waterproof membranes, modified bituminous roofing membranes, self-adhering roofing membranes, or single ply waterproofing roofing membranes (e.g. EPDM waterproof roofing membranes, PVC waterproof roofing membranes, TPO waterproof roofing membranes, synthetic underlay). One exemplary membrane sheet is Deck-Armor™ Roof Protection, manufactured by GAF Corp., Wayne, N.J.

As used herein, the term "roofing" means the provision of a protective covering on the roof surface of a building.

Without limitation, such a protective covering might take the form of shingles, tiles, panels, shakes, planks, boards, modules, moldings or sheets.

As used herein, the terms "cladding" and/or "siding" mean the provision of a protective covering on a side or other surface of a building. Without limitation, such a protective covering might take the form of shingles, tiles, panels, shakes, planks, boards, modules, moldings or sheets.

As used herein, the terms "profiled" and/or "contoured" mean having a region, or regions which extend above or below a notional planar surface lying along the longitudinal axis of the product. This includes profiling or contouring of only one upper or lower surface, and/or profiling or contouring of an entire thickness of material such that the upper and lower surfaces have the same relative degree of extension above or below the notional planar surface.

As used herein, the term "polymer" (and associated terms such as "polymeric") includes polymers, polymer blends, polymer alloys, polymer compounds and polymers with or without additive inclusions.

As used herein, the term "mechanical bond" means a bond between surfaces which have physical features to create more bonding surface area. For example, the surfaces may have surface textures or other three-dimensional features which allow keying, interlocking, increased friction fit, etc., between the surfaces bonded.

As used herein, the term "w/w" when referring to a component of a layer, refers to the weight of the constituents or components making up the total weight of a layer so formed.

As used herein, the term "colored material" refers to one or more dyes or pigments or colored particles which may be used to add surface color and/or decoration and/or texture to the module. The colored material may be transparent, translucent or opaque, and may comprise multiple components of different types of coloring or colored agents. The colored material may be applied to a precursor or module that has already been colored during the forming process.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

Figure 1:
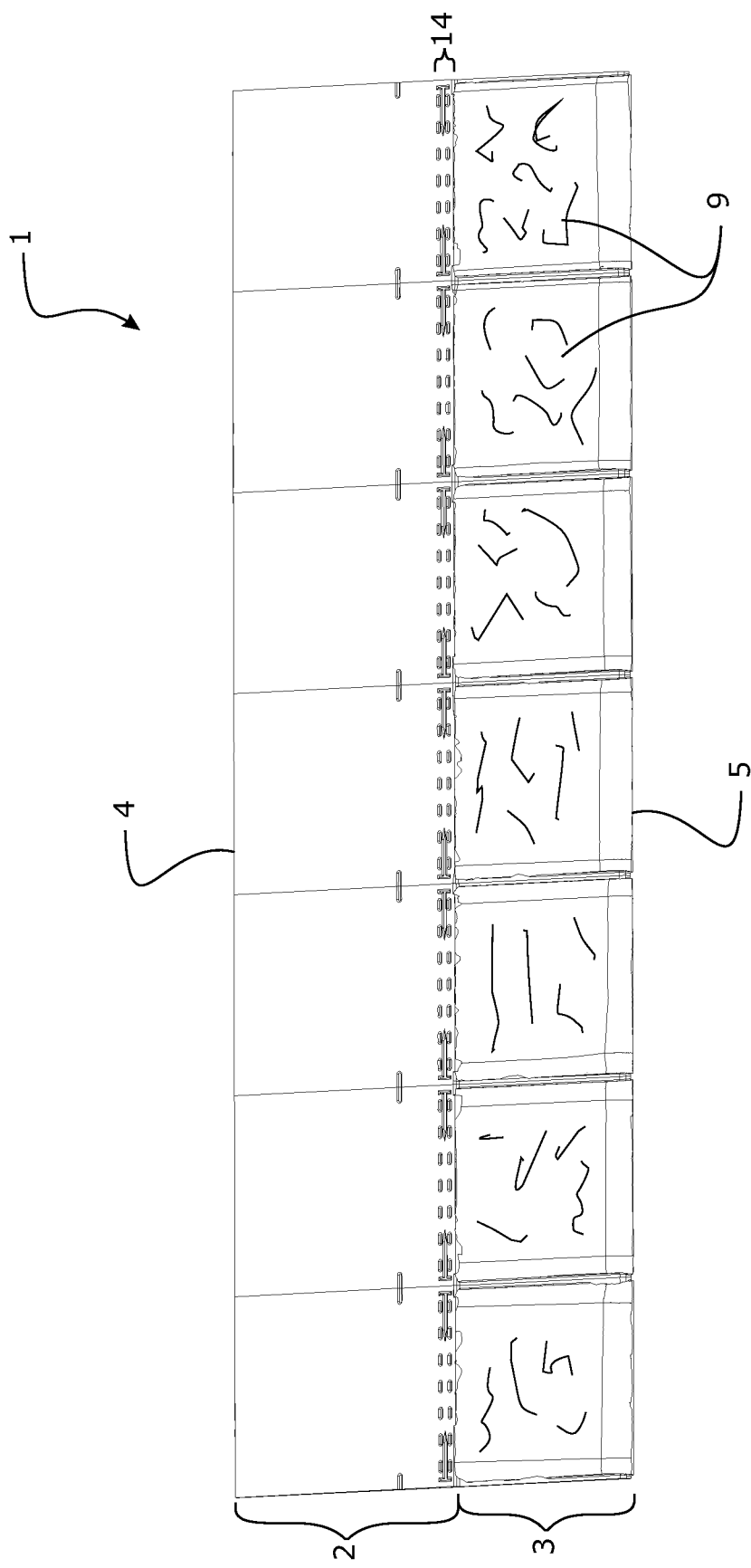
FIG. 1 is a plan view of one preferred embodiment of the roofing, cladding, or siding module of the present invention.

The present invention relates to a roofing, cladding, or siding module, for installing onto a building surface.

Roofing, cladding and siding products for installation onto building surfaces need to be lightweight, easy to install, weatherproof, resistant to environmental wear, aesthetically pleasing and preferably economical and efficient to manufacture. Polymeric materials are suitable candidates for roofing, cladding and siding products due to their weight, durability and cost-effectiveness.

However, consumers typically prefer the appearance of more traditional roofing, cladding or siding products, such as asphalt shingles, shingles, slates or shakes, concrete tiles, etc. Accordingly, polymeric products need to be cosmetically treated to simulate the appearance of these more traditional products. Systems and methods for manufacturing these polymeric products need to be suitably flexible, in order to be able to simulate a variety of materials.

In particular embodiments of the present invention, the roofing, cladding and/or siding module has improved weather resistance (e.g., water resistance, hail-proofing), durability, fire resistance, flame retardant qualities and/or aesthetic qualities.

Other embodiments of the present invention relate to improved methods and systems for manufacturing and coloring a roofing, cladding or siding module out of a polymeric material, such that the module resembles tiles, shingles, etc., made of another type of material.

Preferred embodiments of the present invention relate to improved methods and systems for manufacturing a roofing, cladding or siding module in a high speed and/or cost-effective and/or efficient process.

For example, preferred embodiments of the present invention relate to continuous forming processes, and to modules manufactured using such processes. Larger areas and lengths of the module may be produced over a shorter duration of time compared to prior art methods such as injection or pressure molding. It is envisaged that the continuous forming system of the present invention can produce approximately 5 to 60 m of product per minute. In one embodiment, the continuous forming system produces approximately 20 m of product per minute.

In one particular example, a single moulding machine (e.g. may be continuous) may be utilised having a plurality (e.g. 2 or more) output tracks or lanes of as-molded products exiting from the machine. In this manner, a plurality of as-moulded products may be simultaneously formed.

Further, the continuous forming method of the present invention produces a module that lacks weld lines, attachments or injection moulding points along the entire length of the module. Weld lines are formed during injection molding processes when two or more molten polymer flows meet. This can occur when a polymer flow splits to go around an interruption (e.g., a post that forms a hole) and then rejoins, or when polymer melt fronts meet, from multiple injection points. This can also occur when molten polymer meets a non molten polymer. Consequently, a visible weld line is observed and the adhesion/bond in this weld line at the interface is weaker than the balance of the polymer within the product.

Figure 5:
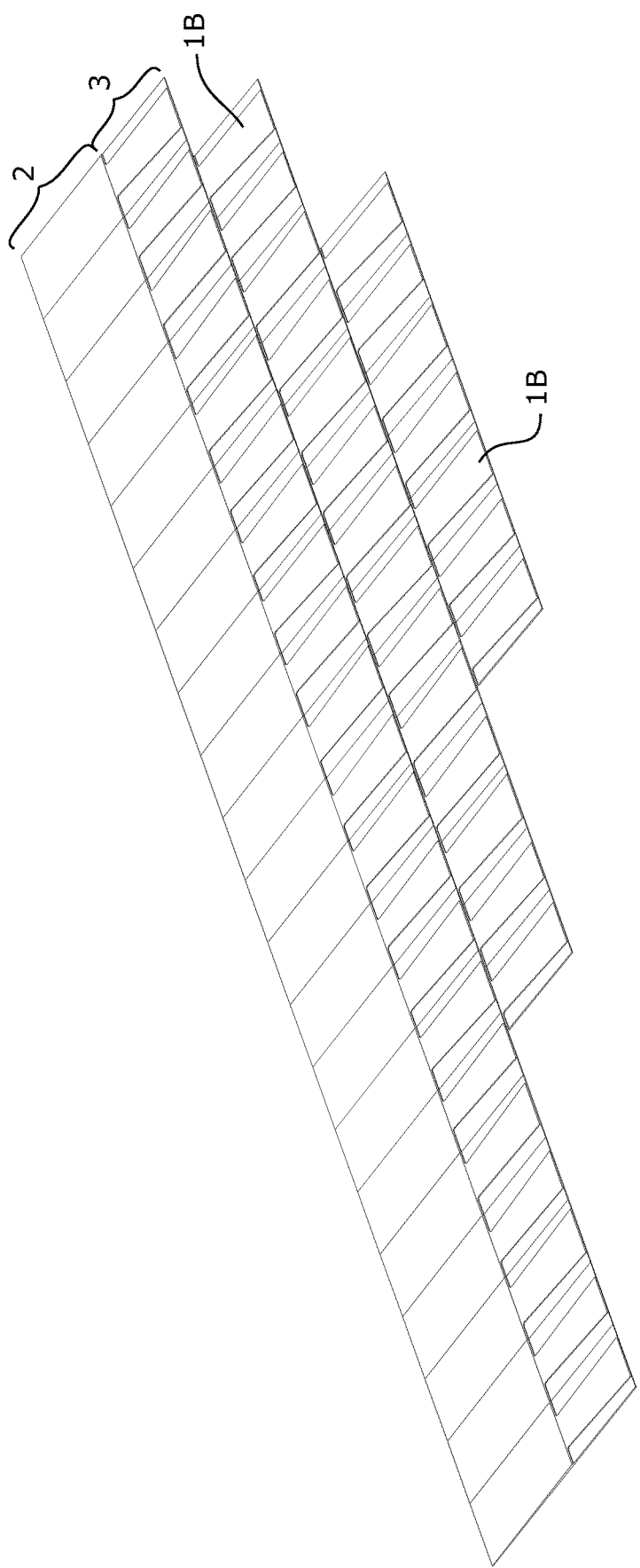
FIG. 5 is a top perspective view of an assembly comprising a plurality of roofing, cladding, or siding modules according to a second embodiment of the present invention.

Injection moulding points are the area of a product where the heated material was fed into the mold cavity. It is also difficult to make a product comprising more than one layer of material using injection moulding, and injection moulding is slow and may produce color differences or variations that affect the aesthetics of the final product. In one embodiment, as shown in FIG. 1, the module 1 preferably comprises an underlapping region 2 extending from a head edge 4 of the module and an exposed region 3 extending from a foot edge 5 of the module. The underlapping region 2 is adapted to be substantially covered by the exposed region of an adjacent or overlapping module when installed on a building surface, as shown in FIG. 5. The module may take a variety of forms, for example, several variations 1, 1a, 1b, 1c, 1d, 1e are shown in FIGS. 1, 3, 5, 6, 14 and 15.

The module preferably has at least one layer which is formed of an extruded material comprising one or more polymers and at least 40% filler and/or reinforcement.

Figure 4A:
FIG. 4*a* is a cross-sectional view across the width of one embodiment of the roofing, cladding, or siding module.

FIG. 4a shows a cross-sectional view of one embodiment of the module 1. The module comprises a single layer along a section of the module or along the entire length of the module. In the preferred embodiment, the layer is formed of an extruded material comprising at least about 40% w/w/ filler and/or reinforcement, more preferably at least about 60% w/w filler and/or reinforcement.

In an embodiment, at least a portion of the underlapping region 2 of the module is formed of the extruded material comprising at least about 40% w/w filler and/or reinforcement, more preferably at least about 60% w/w filler and/or reinforcement.

The extruded material comprises one or more of the following polymers: polystyrene (GPPS), polyethylene terephthalate (PET), polyester methacrylate (PEM), high impact polystyrene (HIPS), acrylonitrile butadiene styrene (ABS), polyvinyl chloride (PVC), polyurethanes (PU), polyethylene (PE) including homopolymer, copolymer, block copolymer and terpolymer forms, polylactic acid (PLA), nylon (PA), acrylics (PMMA), high density polyethylene (HDPE), low density polyethylene (LDPE), linear low density polyethylene (LLDPE), medium density polyethylene (MDPE), cross linked polyethylene (PEX), thermoplastic elastomer (TPE), thermoplastic polyolefin (TPO), thermoplastic rubber (TPR), polypropylene (PP) including homopolymer and copolymer forms, polybutylene terephthalate (PBT), styrene-acrylonitrile resin (SAN), ethylene tetrafluoroethylene (ETFE), vinyl, methacrylate copolymers, etc. Any of these polymers may be foamed if suitable.

Examples of suitable fillers include any one or more of talc, calcium carbonate, mica, silica, kaolin, calcium sulphate, magnesium hydroxide, stabilizers, dolomite, etc.

Examples of suitable reinforcements include any one or more of glass fibres, glass beads, glass flakes, natural fibres such as flax, cellulose, wood fibres, wood flour, cotton and sawdust, inorganic fibres, polymer fibres, polymer scrim, polymer knit, polymer weave, aramids, ceramics, etc.

Fillers are added to the extruded material to reduce the amount of the more expensive polymer component, hence reducing the material cost. However, increasing the filler content tends to negatively affect the physical properties of the extruded material. For example, prior art injection moulded products typically require relatively low filler content, otherwise the material does not flow to fill the dies and/or becomes too hard to be mouldable and/or the moulded product is unstable (e.g., may be poor melt flow or may be due to thermal expansion) or brittle. Prior art products compensate by adding a reinforcing scrim layer between layers of polymer; however, these are typically difficult and expensive to manufacture. In particular, it is challenging to obtain a consistent positioning of the scrim layer between the polymer layers, and may be difficult to form a 3-D molded product or desired shape of the scrim itself, and even more so when there is a scrim layer needing to be encapsulated between layers of polymer In contrast, the extruded material of the present invention comprises at least about 40% w/w filler and/or reinforcement, and preferably at least about 60% w/w filler and/or reinforcement. In some embodiments, the percentage of filler and/or reinforcement is between about 60% and 95% by weight of the extruded material.

Provision of filler and/or reinforcement into a layer can provide for an increased weight or density or bulk (e.g. volume) of a layer so formed and thereby of a module made by at least one of such a layer.

In one embodiment, the extruded material comprises both filler and reinforcement. That is at least 40% w/w of the extruded material comprises filler and reinforcement.

In some embodiment, the extruded material does not contain reinforcement. In some embodiments, the extruded material comprises at least about 5% w/w reinforcement (i.e., in this embodiment, the extruded material comprises at least about 55% w/w filler and at least about 5% w/w reinforcement). In some embodiments, the extruded material comprises between about 5% and 20% w/w reinforcement, preferably about 10% reinforcement.

In preferred embodiments, the reinforcement comprises glass fibres. In an example, typical dimensions of the glass fibre prior to processing (e.g., prior to the extrusion process) may be between about 0.5 and 5 mm in length (or may be about 1-5 mm, or about 2-5 mm, or about 3-5 mm in length) and about 0.015 to about 0.018 mm in diameter.

In addition to toughening the module, the reinforcement may also reduce thermal expansion of the module, hence improving stability and durability of the module when exposed to cyclical variations in heat. In an embodiment, the glass fibres align along the length of the module during the forming process. As a result, the module is particularly stable along its length (i.e., the longest dimension of the module, which typically undergoes greatest change in length due to thermal expansion).

Table 1 compares the thermal expansion coefficient of three test samples: a) polymer (TPO) with no filler and no reinforcement, b) exemplary prior art product comprising a layer of reinforcing (polyester) scrim encapsulated between top and bottom TPO layers, the TPO layers comprising 40% w/w filler, and c) one embodiment of the present invention comprising polymer (TPO) with 80% w/w filler and 10% w/w reinforcement. In each case, heat was applied to the test sample to raise the temperature of the sample by about 80° C. from ambient temperature. The dimensions of each sample were measured at initial (ambient) temperature of about 14° C. and again at the final elevated temperature of about 94° C. to determine the thermal expansion.

The embodiment of the present invention demonstrates much less thermal expansion, compared to pure polymer. The present embodiment instead undergoes minimal thermal expansion that is comparable to polymer reinforced with a scrim layer, but does not suffer from the manufacturing challenges associated with the prior art product.

TABLE 1

Thermal expansion coefficient of test samples with differing levels of filler.

| Polymer | % filler | % reinforcement | Thermal expansion coefficient ($10^{-6}$ m/(m K)) |
|---|---|---|---|
| TPO | 0 | 0 | 165 |
| TPO with reinforcing scrim | 40 | 0 | 10 |
| TPO | 80 | 10 | 22 |

Due to the specific content of the extruded material, the layer of the module is tough, heat-stable and low cost (in particular due to the high filler content).

The entire length of the module is preferably manufactured in a single continuous forming process (described in more detail below). It is envisaged that module may be formed in lengths of at least about 0.5 m. Alternatively, the module may be formed in lengths of about 36 inches long. Alternatively, the module may be formed in lengths of at least about 1 m, 1.5 m, 2 m, 2.5 m, 3 m, or any numerical value in between.

In addition to the increase in productivity and reduction in cost, moulding the entire length of the module in a continuous process eliminates any weld lines. This increases the durability and weather resistance of the modules, and improves the appearance of the final product.

In other embodiments, the extruded material may further comprise one or more of the following additives: colorants (including but not limited to carbon black, titanium dioxide), flame retardants (including but not limited to magnesium hydroxide, aluminum trihydrate), stabilizers (including but not limited to UV light stabilizers such as hindered amine light stabilizers (HALS), and thermal stabilizers such as phenolics), foaming agents (including but not limited to exothermic, endothermic or gas foaming agents), lubricants, and/or biocides (including but not limited to particles of silver, including nano-sized silver particles).

Figure 4B:
FIG. 4*b* is a cross-sectional view across the width of a second embodiment of the roofing, cladding, or siding module.

FIG. 4b shows a cross-sectional view of a second embodiment of the module 1. The module comprises two layers along a section of the module or along the entire length of the module. In one embodiment, the base or bottom layer 8 is formed of an extruded material comprising at least 60% filler and at least 5% reinforcement.

In other embodiments, the top layer 6 or both layers is/are formed of an extruded material comprising at least 60% filler and at least 5% reinforcement. That is, the percentages and/or material of the polymer(s) and/or filler and/or reinforcement may be the same or different in each layer. The material content of each layer is preferably selected to suit the function, appearance and/or exposure of the particular layer.

Figure 4C:
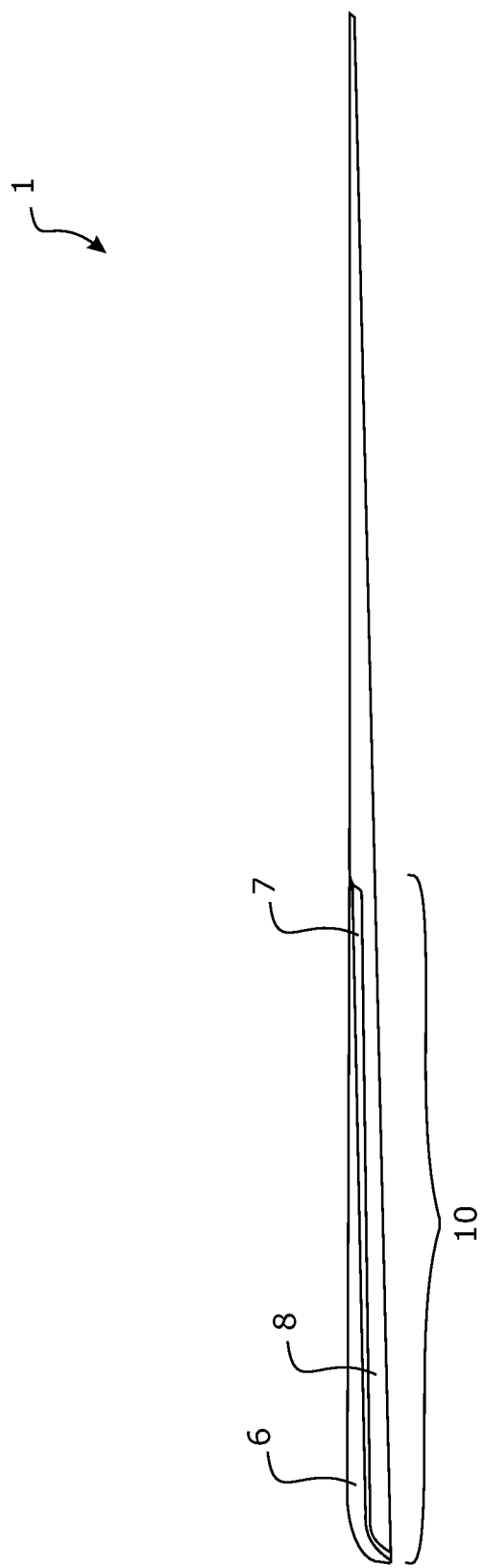
FIG. 4*c* is a cross-sectional view across the width of a third embodiment of the roofing, cladding, or siding module.

FIG. 4c shows a cross-sectional view of a third embodiment of the module 1. The module has at least one portion 10 which comprises at least three layers: a top layer 6, a bottom layer 8, and an intermediate layer 7 between the top and bottom layers. Alternatively, the module may be formed from more than three layers, for example if more than one layer of material forms a precursor to the top layer, intermediate layer and/or bottom layer.

In an embodiment, at least one layer is formed of an extruded material comprising at least 40% filler and/or reinforcement, preferably at least 60% filler and/or reinforcement. The module may further comprise one or more additional layers formed of material that may comprise less than 40% filler and/or reinforcement.

In an embodiment, the at least one layer formed of an extruded material comprising at least 40% filler and/or reinforcement is a base or bottom layer that substantially contributes to the structure of the module. In some embodiments, this base or bottom layer is formed of an extruded material comprising at least 60% filler and at least 5% reinforcement.

In some embodiments, the base or bottom layer comprises about 80% to 85% w/w filler and/or reinforcement, more specifically, about 70% to 75% filler and about 10% w/w reinforcement. Optionally, such a base or bottom layer may have a thickness of about 1-3 mm. The resulting layer(s) may provide resistance against significant thermal expansion of the module, which in turn may help reduce shear forces between layers and/or other structures attached to the module that may be due to thermal expansion of those other layers. In other embodiments, the structural layer(s) may be provided as one or more intermediate and/or upper layer(s).

In some embodiments, the upper or top layer(s) 6 and/or the intermediate layer(s) 7 and/or two or more layers may also be formed of an extruded material comprising at least 60% filler and/or reinforcement. In some embodiments, the extruded material comprises at least 5% reinforcement. The material of the matrix and/or filler and/or reinforcement may be the same or different in each layer.

In one example, the top layer 6 may comprise at least 65% filler, and no reinforcement. The higher polymer content may be suitable for the top layer, e.g., to facilitate binding of colored material (as described in more detail below). Optionally, such a top layer may have a thickness of about 0.4 mm.

In one example, the intermediate layer may comprise about 100% polymer (i.e., the intermediate layer may not comprise filler or reinforcement), which may increase one or more particular reinforcing properties of the layer, such as waterproofing. In one example, the intermediate layer may comprise a polypropylene copolymer reinforced with a copolymer polyethylene. The reinforcing polymer may comprise up to about 50% w/w of the layer, preferably between 10% and 25% w/w of the layer. Optionally, such an intermediate layer may have a thickness of about 0.5 mm.

According to the above description, a multi-layered module may be formed using at least the top layer, the intermediate layer and the base or bottom layer as described above.

Regardless of whether the module comprises one or more layers, in the preferred embodiment, one or more of the layers may comprise(s) three-dimensional features such as surface texturing, surface relief or other three-dimensional pattern or ornamentation. For example, FIG. 1 schematically shows surface texturing on the exposed regions 3 of the module 1 (i.e., the surface is not smooth), to simulate asphalt shingles.

In the preferred embodiment, at least a portion of the exposed region 3 of the module has three-dimensional surface features. Accordingly, in the multi-layered embodiments shown in FIG. 4b, at least a portion of the upper surface of the top layer, corresponding to the exposed region in the finished module, may have three-dimensional surface features.

The module may additionally or alternatively comprise two or three dimensional surface features such as coloring, patterning, surface cracking or fracturing or other two- or three-dimensional decoration or ornamentation.

These three dimensional and/or two dimensional (e.g. flat) surface features are preferably provided on at least the exposed region 3 of the module, in order to simulate another type of natural or manufactured material, including but not limited to asphalt shingles, slate, timber shingles or shakes, concrete tiles, stone chips, weatherboard, thatch, stone, woodgrain, metal (e.g., copper tiles), etc.

In one embodiment, as shown in FIG. 4, the module comprises at least three layers at the exposed and fastening regions. In this embodiment, the top layer 6 provides the cosmetic finish on the exposed region of the module, and preferably includes surface features on the top surface as described above. The intermediate layer 7 may provide additional reinforcement, water or weather resistance and/or a binding layer between the top and bottom layers. The bottom layer 8 forms the base structure of the module and therefore preferably extends throughout the entire width and length of the module. In one embodiment, the bottom surface of the bottom layer at the exposed region further includes projections (e.g., ribs) that provide adhesion surfaces, as described in more detail below.

The module may comprise three layers in any arrangement, and across any region of the module. Exemplary embodiments are shown in FIGS. 13a-13h.

In another embodiment shown in FIG. 4b, the module comprises at least two layers at the exposed and/or fastening region(s). The top layer 6 may provide the cosmetic finish on the exposed region of the module, and preferably includes surface features on the top surface as described above. The base or bottom layer 8 may provide the base structure for the module, and may be reinforced. In one embodiment, the bottom surface of the base layer 8 may further includes projections (e.g., ribs) that provide adhesion surfaces, as described in more detail below.

In the single-layered embodiment shown in FIG. 4a, the layer may have a cosmetic finish (e.g. surface color added) on the exposed region of the module, and preferably includes surface features on the top surface as described above. The layer may also provide structural support for the module, and may likewise be reinforced (e.g., with reinforcement additives, surface treatment, surface features such as projections, etc.).

In one embodiment, where the module has at least one portion 10 which comprises more than one layer, one or more of the layers may be extruded. If two or more layers are extruded, they may be co-extruded.

Figure 9:
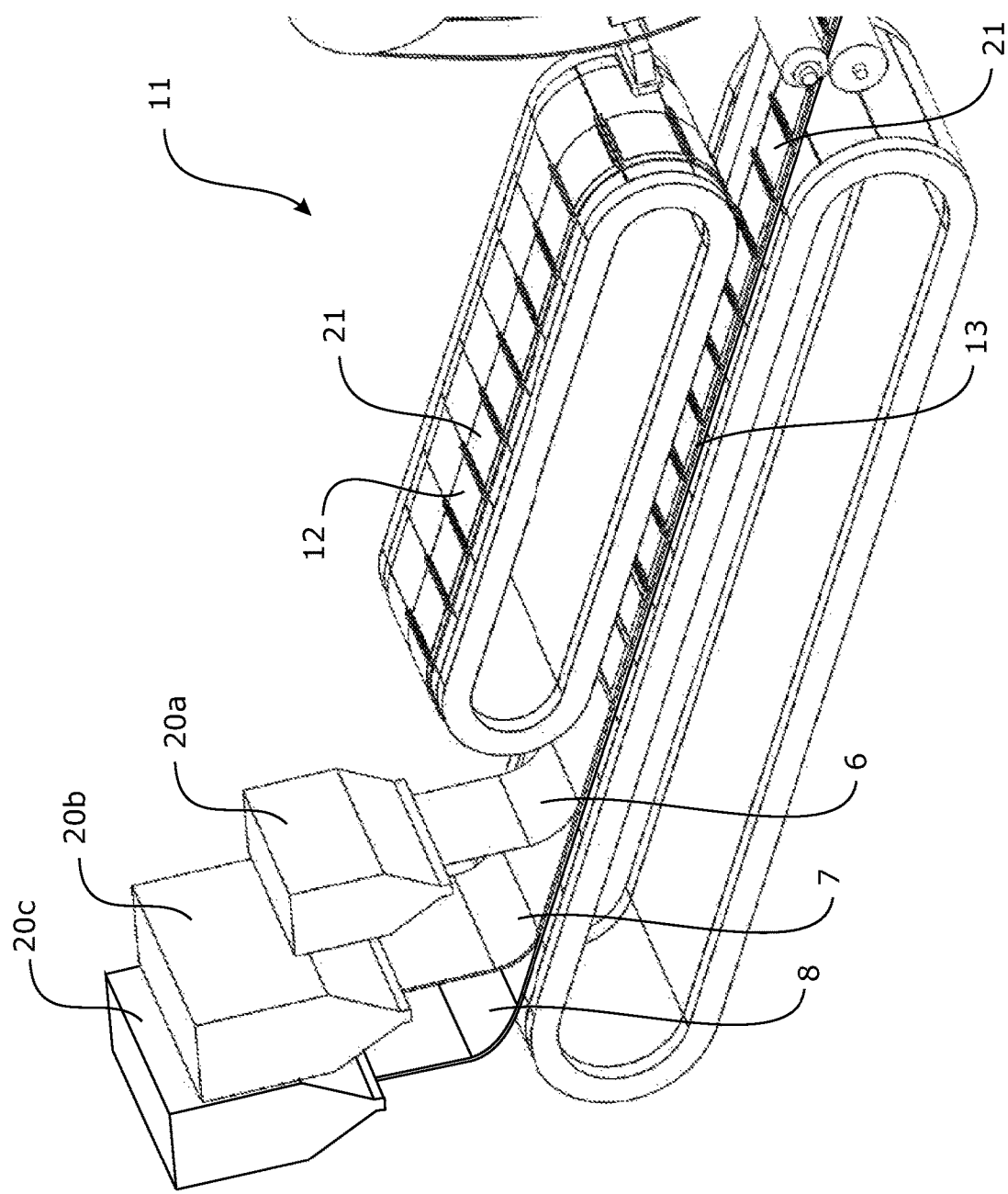
FIG. 9 shows a continuous forming system of one preferred embodiment of the present invention, which may be used to manufacture a roofing, cladding, or siding module of the present invention.

Alternatively, the layers may be extruded in series from two or more serially arranged extruders 20a, 20b, 20c, as shown in FIG. 9. Preferably, a first extruded layer is deposited onto an advancing support surface of a continuous forming machine 11, and subsequently the other extruded layer(s) is/are deposited on top of the first layer. The layers then proceed as a layered feed to be molded between the first forming surface 12 and second forming surface 13, preferably as described below.

Alternatively, one or more of the layers may be molded by thermoforming, compression moulding, pressing or other method of forming. In any case, the layers are subsequently joined together preferably by the continuous forming machine 11 as described below.

Preferably, the layers are joined or laminated together to form the module in a continuous forming process (described in more detail below). The layers and/or their content, such as the polymer(s) is/are selected to be compatible with each other, to ensure adequate joining/fusing between each layer. The preferred forming process allows for multiple layers in various configurations (e.g., varying continuity, material properties, etc) to be joined together to form the finished module. Referring to the cross-sectional view of one example of the module shown in FIG. 4c, in a preferred embodiment of the present invention, one or more properties of the intermediate layer 7 varies along the length and/or width of this layer.

In one example, as shown in FIG. 4, the thickness of the intermediate layer 7 varies along its width. Specifically, the intermediate layer is thinner near the foot edge 5 of the module, and increases in thickness towards the middle of the module. As will be discussed in more detail below, this thicker portion preferably coincides with the fastening region of the module.

In other examples, as shown in FIGS. 13b to 13d, and 13h, the reinforcing layer 7 may be formed above or below the top or bottom layer of the module respectively. The reinforcing layer may be present intermediate the head edge 4 and foot edge 5 of the module, or may extend to one or both of the edges. The intermediate layer (where present) may be between 0.01 and 10 mm thick, whether of a constant thickness throughout, or whether the thickness varies as discussed above. Preferably, the intermediate layer may be between 0.1 and 0.5 mm thick; or may be any numerical value between 0.01 and 10 mm.

The top and bottom layers may each be between 0.1 and 50 mm thick, whether the thickness is constant or varying across each layer. Preferably, the top layer is between 0.1 to about 10 mm thick. Preferably, the top layer is about 0.05, 0.1, 0.2, 0.3, 0.4, 0.5, 0.6, 0.7, 0.8, 0.9 mm thick, or may be numerical values between each of these. Preferably, the bottom layer is about 0.1 to about 10 mm thick. Preferably, is the bottom layer about 0.5, 1, 2, 3, 4, 5, 6, 7, 8, 9 mm thick, or may be numerical values between each of these.

Additionally or alternatively, the varying property of the intermediate layer could be a change in surface area of the intermediate layer, for example by corrugating (or changing the degree of corrugations on) a portion of the intermediate layer.

Other additional or alternative properties of the intermediate layer which may be varied along the length or width of the layer include tensile strength, shear strength, resilience, elasticity, flexibility, toughness, fire resistance, water resistance, continuity or uniformity, water-proofing, impact resistance, resistance to pull through, fixing capability, chemical resistance, puncture resistance, content of filler and/or reinforcement, concentration of filler and/or reinforcement, color, microbial resistance, temperature resistance, light/heat absorption/reflectivity, thermal transfer, etc., of the layer. Regarding continuity and uniformity, there may be areas where the intermediate layer is not present in the module, such that the intermediate layer is discontinuous across the length and/or width of the module.

In other embodiments, one or more property/properties of the other layers (i.e., the top or bottom layer) may additionally or alternatively vary along the length and/or width of the layer. In another example, the surface area of the intermediate layer may be varied by changing the properties of three-dimensional surface features on the intermediate layer. The intermediate layer may have three-dimensional surface texturing, or other projections, corrugations, reinforcements, chemical coatings, protrusions, apertures, perforations or surface roughness which increase the mechanical bonding of this layer to the top and/or bottom layers.

Alternatively, any one of the layers, such as the intermediate layer, may be pre-formed (e.g., by extrusion, or other type of forming process) and subsequently introduced to the forming/lamination process to form the module. In another embodiment, the layer may be heated or reheated so that it is in a molten or pliable state when fed to the forming/laminating machine.

These variations in the property/properties of these surface features may be implemented when forming the intermediate layer. For example, the height or width of the surface features may vary along one or more directions of the layer, or in specific areas of the layer. Additionally or alternatively, the number of surface features (i.e., the concentration of surface features per unit length or width of the layer) may vary along one or more directions of the layer, or in specific areas of the layer.

Additionally or alternatively, the variation in the property/properties of the intermediate layer may be caused by deforming the intermediate layer before or during joining or laminating to the top and/or bottom layers. For example, by stretching a localized portion of the intermediate layer while it is still in a molten, semi-molten or pliable state, the concentration of surface features within this region may be reduced. Accordingly, the mechanical bond strength at this region would be weaker compared to other non-deformed regions, or preferentially reduced to provide for desired mechanical properties of the intermediate layer and its reinforcement of the associated upper and lower layers.

In the preferred embodiment, the intermediate layer is a reinforcing layer (e.g., a reinforcing film, mesh, scrim, weave, fibre, fabric, wire, string, web or sheet) between the top and bottom layers. Accordingly, the intermediate reinforcing layer preferably provides for one or more of: resistance against shrinkage, resistance against warping, resistance against tearing, increased toughness, prevention against unwanted deflections of the module, weather or water resistance, reduced flammability, impact resistance, resistance to pull through (e.g., of fasteners due to high winds), fixing capability, chemical resistance, puncture resistance, sealing (e.g., self-sealing around fasteners), shape memory and increased resistance against delamination of the layers, adhesive/gluing/bonding capability, etc.

The pull through strength of the module is preferably at least as required in the standard specification for asphalt shingles made from glass felt and surfaced with mineral granules (ASTM D3462). The standard specifies that when pulling a nail head through the shingle at 100 mm/min, the pull through force is at least 90 N. Accordingly, the nail pull through force demonstrated by the present module is at least about 90 N, more preferably at least about 100 N, and may be more than 130 N.

To increase the weather resistance of the module, the intermediate layer may provide a substantially water or liquid resistant barrier, or a water or liquid impermeable barrier between the top and bottom layers. This is particularly advantageous where the top or bottom layers are porous.

For example, the top layer of the module may be fractured or otherwise crazed to provide surface ornamentation for simulating another type of material. Accordingly, the intermediate layer preferably provides a substantially waterproof barrier below this top surface, at least at the porous region(s).

The reinforcing properties of the intermediate layer may vary depending on the requirements at different sections of the module. At zones of increased exposure or under increased loading, for example, the reinforcing properties of the intermediate layer may be increased, but at other sections, may be reduced to reduce the amount of material used.

For example, the module may further comprise a fastening region 14 for receiving one or more fasteners that fix the module to the building surface when installed. As shown in FIG. 1, the fastening region may be substantially adjacent the exposed region 3 and within the underlapping region 2. The fastening region may include a visual guide or boundary markers to allow visual identification of the region.

The fasteners may be nails, screws, etc, which puncture or penetrate the module when installed. Accordingly, the intermediate layer may extend from at or adjacent the foot edge 5 of the module to within or beyond the fastening region 14 of the module. Alternatively, the intermediate layer may be present only along the fastening region 14 of the module.

Alternatively, if the module does not require penetrative fastenings, the intermediate layer may extend from at or adjacent the foot edge, to at or adjacent the underlapping region of the module. That is, the intermediate layer may provide for additional reinforcement and/or weather resistance throughout the exposed region of the module.

Alternatively, the module may comprise more than one intermediate layer. The two or more intermediate layers may comprise the same or different material and/or may perform the same or different functions. The layers may be present as discrete intermediate layers in different regions of the module or there may be multiple intermediate layers in one or more regions of the module. For example, there may be two intermediate layers in the fastening region, one providing a waterproofing function, the other providing self-sealing properties around fasteners. Additionally, the reinforcing property/properties of the intermediate layer may be optimized preferentially within this fastening region 14, to increase the toughness and tear-resistance of the module at this layer. Additionally, the reinforcing property/properties of the intermediate layer may also be increased within the exposed region of the module.

For example, as shown in FIG. 4C, the intermediate layer may be thicker along the fastening region, compared to within the exposed region. The intermediate layer may comprise thickened regions or other 3-dimensional qualities within the fastening region 14, which provide for a fastening region capable of retaining a fastener penetrating the fastening region or resisting tear or pull through of the module by shear force applied to the module or each of the said layers by the fastener.

Additionally, or alternatively, the reinforcing property/properties of the intermediate layer may be optimized preferentially along the direction of the length of the module and/or along the direction of the width of the module. It will be appreciated that the direction and/or regions of optimizing or increasing the reinforcing properties of the intermediate layer will depend on the structural requirements (e.g., the amount of loading, shear force, tensile force, strain, etc., along that direction or within that region) of the module when installed.

As discussed above, variations in these properties may be achieved when forming the intermediate layer, whether by extrusion or other forming processes. These variations may additionally or alternatively be achieved by deforming (e.g., stretching) the intermediate layer when it is being joined to the top and/or bottom layers, and is in a molten or semi-molten moldable state.

Accordingly, the intermediate layer, when being joined to the top and/or bottom layers, is preferably in a molten or semi-molten state, or a cold but pliable, formable or moldable condition. In this state, the intermediate layer is able to be deformed with little or no localized areas of high stress.

Additionally, in the molten or semi-molten state, the intermediate layer may form chemical bonds with compatible material(s) in the top and/or bottom layer. Alternatively, if the intermediate layer may be inserted between molten or semi-molten top and bottom layers, and may therefore form chemical bonds with these layers.

Figure 7:
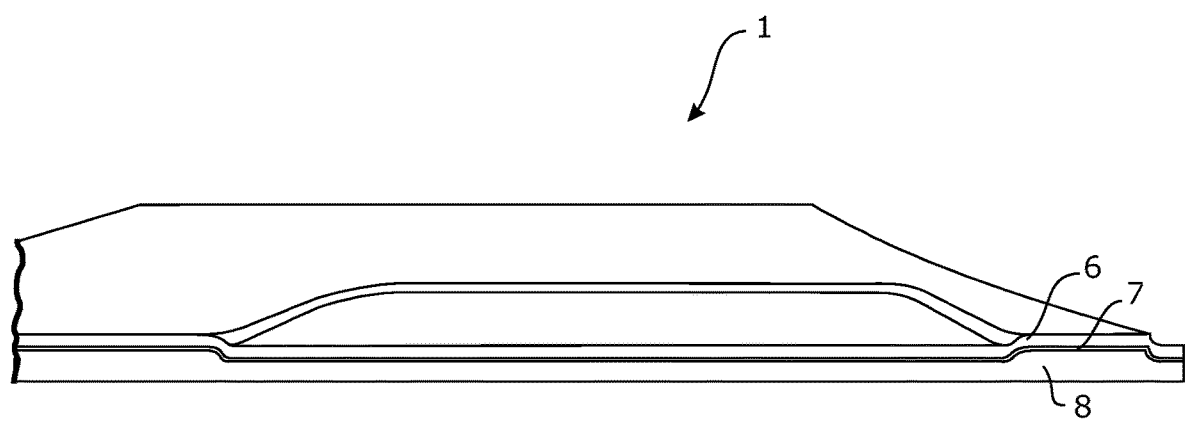
FIGS. 7 and 8 are close-up views of contoured portions of the roofing, cladding, or siding module of the present invention.
Figure 8:
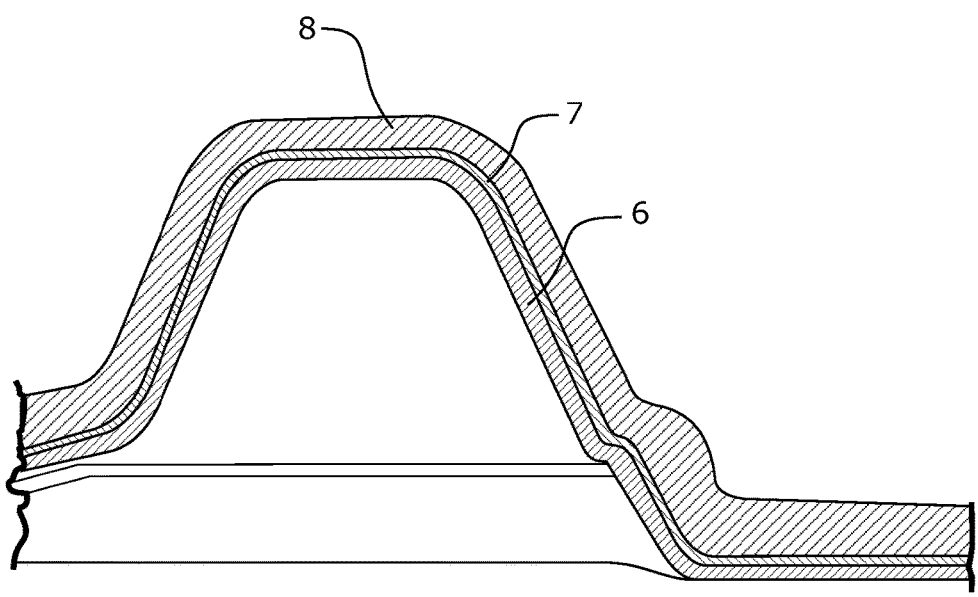

Further, the module may be shaped and/or contoured during the joining/laminating process, while the intermediate layer is in the cold but pliable or molten or semi-molten moldable state. This ensures that the intermediate layer remains substantially aligned and/or substantially consistently positioned between the top and bottom layers through the shape and/or contour. This is shown in the detailed views of FIGS. 7 and 8.

The module may be shaped and/or contoured via a casting, thermoforming, pressing or other forming process, whether continuous or discontinuous, during or after the joining/laminating process.

In another embodiment, all three layers of the module are in a molten, semi-molten, cold but pliable, formable or moldable condition when being joined together. This may further increase the strength of the chemical bond between compatible materials in each layer. This may additionally reduce the occurrence of localized high stress points in the module, whether or not the module is further shaped after joining the layers.

Accordingly, the material for each of the layers (or at least for the intermediate layer) is preferably chosen to have a melt flow index and/or heat capacity sufficiently high such that the layer(s) remain molten or semi-molten or pliable while the module is formed.

Additionally or alternatively, the layers are processed at a sufficiently high temperature such that the layers remain molten or semi-molten or pliable while the module is formed.

Preferably, the layers are each made of, or comprise, one or more polymer(s). Materials which may be used include (but are not limited to) general purpose polystyrene (GPPS), polyethylene terephthalate (PET), polyester methacrylate (PEM), high impact polystyrene (HIPS), acrylonitrile butadiene styrene (ABS), polyvinyl chloride (PVC), polyurethanes (PU), polyethylene (PE) including homopolymer, copolymer, block copolymer and terpolymer forms, polylactic acid (PLA), nylon (PA), acrylics (PMMA), high density polyethylene (HDPE), low density polyethylene (LDPE), linear low density polyethylene (LLDPE), medium density polyethylene (MDPE), cross linked polyethylene (PEX), thermoplastic elastomer (TPE), thermoplastic polyolefin (TPO), thermoplastic rubber (TPR), polypropylene (PP) including homopolymer and copolymer forms, Polybutylene terephthalate (PBT), styrene-acrylonitrile resin (SAN), ethylene tetrafluoroethylene (ETFE), vinyl, methacrylate copolymers, etc. The materials may be a blend of any or all of these, and/or may be foamed.

Any one or more of the layers may further comprise one or more additives, such as, but not limited to fillers (including but not limited to talc, calcium carbonate, mica, silica, kaolin, calcium sulphate, magnesium hydroxide, stabilizers, dolomite), colorants (including but not limited to carbon black, titanium dioxide), reinforcements (including but not limited to glass fibres, glass beads, glass flakes, natural fibres such as flax, cellulose, wood fibres, wood flour, cotton, sawdust, and inorganic or polymer fibres, scrim, knits, weave, non-woven, aramids, ceramics), flame retardants (including but not limited to magnesium hydroxide, aluminum trihydrate), stabilizers (including but not limited to UV light stabilizers such as hindered amine light stabilizers (HALS), and thermal stabilizers such as phenolics), foaming agents (including but not limited to exothermic, endothermic or gas foaming agents), lubricants, or biocides (including but not limited to particles of silver, including nano-sized silver particles).

In particular, at least the top layer preferably has a high UV resistance. Additionally, the module is preferably configured and materials preferably chosen to withstand cyclical variations in temperature, for example, about −40 to about 100 degrees Celsius.

In one embodiment, the polymer(s) of the top and bottom layers has/have a lower degree of crystallinity compared to the polymer(s) of the intermediate layer. That is, the intermediate layer comprises a tougher, more crystalline polymer or polymer blend compared to the top and bottom layers. The top and bottom layers may comprise an amorphous polymer or a polymer which is less crystalline compared to the intermediate layer.

For example, the intermediate layer may comprise polypropylene (PP). The top and/or bottom layers may comprise thermoplastic polyolefin (TPO), which is less crystalline or has fewer crystalline regions compared to polypropylene (PP).

In alternative embodiments, the layers may each have any degree of crystallinity compared to each other.

Additionally or alternatively to selecting different materials with different material properties, the relative crystallinity of the layers may be achieved during manufacture of each layer, for example by controlling the temperature, rate of cooling, rate of extrusion, shear forces, or other factors as known in the art.

Preferably, the top and bottom layers may substantially thermally insulate or encapsulate the intermediate layer, so that the intermediate layer remains molten or semi-molten or pliable during the forming process. This controls the amount and/or rate of shrinkage of the crystalline or semi-crystalline intermediate layer throughout the cooling process, reducing warping in the module.

In other embodiments, the top and bottom layers may also substantially transfer or provide heat to the intermediate layer, to promote or maintain its molten or semi-molten or pliable state.

In addition to, or alternatively to reinforcing the module, the intermediate layer may also provide a binder layer for binding materials in the top and/or bottom layer together to form the module.

For example, the top layer may comprise sections of non-homogenous and/or non-compatible materials in order to achieve a particular surface texture or appearance simulating another type of material. The intermediate layer may be chosen to comprise a material which is compatible with each of the materials in the top layer. The intermediate layer therefore binds to each of the discontinuous sections of the top layer, effectively acting as a binder for binding these sections together.

In order to reduce material costs, the module need not comprise three layers throughout the entire unit of module. The module may comprise a single layer or double layers throughout, or at specific regions, as described previously.

Additionally, to reduce the amount of raw material required for production, the top and/or bottom layer may be foamed. This additionally reduces the weight of the module. In the preferred embodiment, the bottom layer 8 is made of a foamed polymer, such as foamed thermoplastic polyolefin (TPO).

The module may comprise one or more anti-scuff or protective layers on a top surface of the module, to protect at least the exposed region of the module during storage, transport and installation. The layer may be applied as an integral layer, or may be removably provided as a release sheet (to be removed after installation). The anti-scuff layer may be a layer of substantially virgin polymer, or a layer or coating comprising polymer or other suitable materials.

In some embodiments, the module may comprise one or more side laps for lapping under an adjacent module, to increase water resistance between adjacent modules. The side lap may be thinner, and/or may comprise fewer layers than other portions of the module.

Side laps can provide for regions upon which adjacent modules may overlap with another module.

Further, to reduce the amount of raw material for the bottom layer, the under surface of the layer may comprise projections instead of being a solid, continuous surface.

The projections provide surfaces upon which the exposed region of the module may be adhered to the top surface of the underlapping region of an adjacent and/or overlapping module when installed. The projections provide sufficient adhesive surface area over discrete regions of the base, instead of a solid continuous surface, which would be more affected by shrinkage or thermal expansion/contraction, causing issues with adhesion. The projections further provide the required strength and rigidity of the layer, while reducing the weight of the layer.

Figure 2:
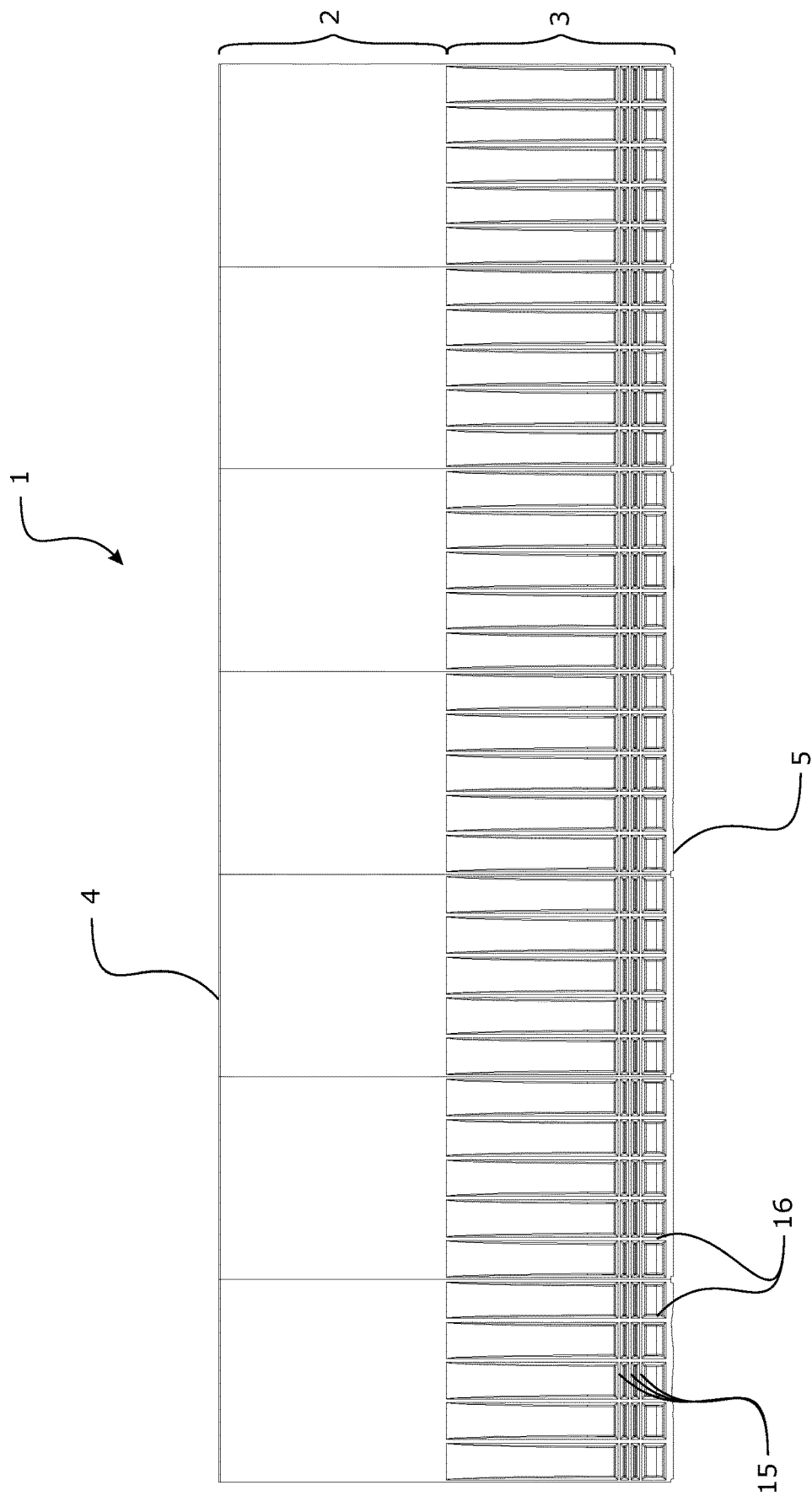
FIG. 2 is a bottom view of the roofing, cladding, or siding module of FIG. 1.
Figure 3:
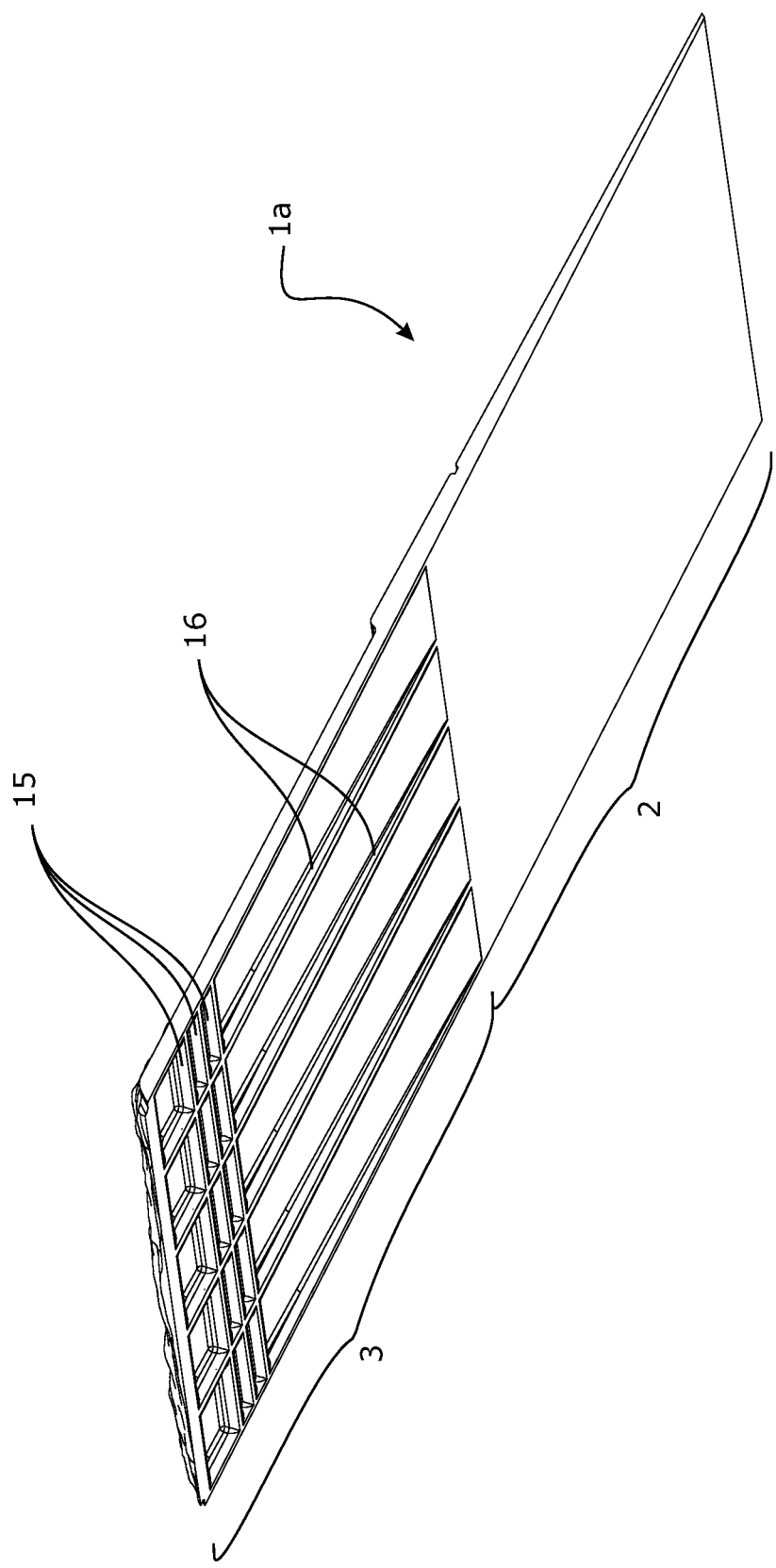
FIG. 3 is a bottom perspective view of a section of the roofing, cladding, or siding module of FIG. 1.

In one embodiment, as shown in FIGS. 2 and 3, the projections comprise one or more longitudinal ribs 15 or other formations extending along the length of the module.

Each longitudinal rib 15 may be continuous or discontinuous throughout its length, but preferably provides sufficient coverage of the module to provide sufficient adhesion surfaces. More preferably, the longitudinal rib extends through the entire length of the module, in order to provide sufficient strength along the length, and prevent warping along the length.

In one embodiment, the longitudinal ribs 15 extend substantially parallel to the foot edge 5 of the module. Alternatively, the longitudinal rib 15 may extend along a direction which is not parallel to the foot edge (e.g., the rib(s) may extend(s) diagonally across the module), but the rib preferably still extends along a substantial portion of the length of the module. Preferably, the ribs are positioned near the foot edge 5 of the module, so that this edge of the exposed region of the module be adhered to the top of the adjacent or overlapping module, and may sit flush on the top surface.

For this purpose, the module may also be formed with a convex precamber perpendicular to the length of the module, such that the exposed region is curved downwardly of the underlapping region. This pre-load pressure encourages the projections/ribs to contact firmly onto the underlapping panel when installed on the building surface.

Preferably, as illustrated, there are a plurality of longitudinal ribs 15 (e.g., three ribs), extending substantially parallel to each other and spaced approximately 1 to 100 mm (preferably 1 to 10 mm) apart from each other. The height of the, or each, longitudinal rib may be between 1 and 100 mm (preferably, between 1 and 10 mm). The or each longitudinal rib may be between 1 and 1000 mm wide (preferably between 1 and 10 mm wide, or sufficiently wide to provide surfaces for adhering the module to the top of an adjacent or overlapping module when installed.

In the preferred embodiment, the under surface of the bottom layer may further comprise a plurality of transverse ribs 16. These transverse ribs 16 may extend substantially perpendicular to the longitudinal ribs 15 and/or perpendicular to the length of the module. Alternatively, the transverse ribs may extend along any other direction, but preferably still extends along a substantial portion of the width of at least the exposed region of the module.

These transverse ribs may provide adhesion surfaces in addition to, or alternatively to the longitudinal ribs. The transverse ribs preferably strengthen at least the exposed region of the module, preventing warping or curling of the module along its width. The transverse ribs 16 therefore preferably extends from at, or adjacent, the foot edge 5 to at, or adjacent, the underlapping region of the module.

Preferably, the transverse ribs are spaced between 1 and 100 mm (preferably, 1 and 10 mm) apart from each other and extend substantially parallel to each other. The width of each transverse rib may be between 1 and 1000 mm (preferably, between 1 and 10 mm).

In one embodiment as shown more clearly in FIG. 3, the height of the transverse ribs tapers from at or adjacent the foot edge to, at, or adjacent, the underlapping region. This means that there is a decrease in spacing between the module and the building surface from the exposed region towards the underlapping region. This enables at least the exposed region of the adjacent overlapping module to be kept substantially parallel to the building surface.

The projections are preferably molded into the under surface of the exposed region of the module during the forming process, for example by one or more die faces on the second forming surface 13.

Alternatively, the projections may be pre-formed or post-formed from the same material as the under surface of the module and incorporated into the module during or after the forming process.

Alternatively, the projections may be formed from a different material compared to the under surface of the module, and may be incorporated into the module before, during or after forming the module.

Figure 14:
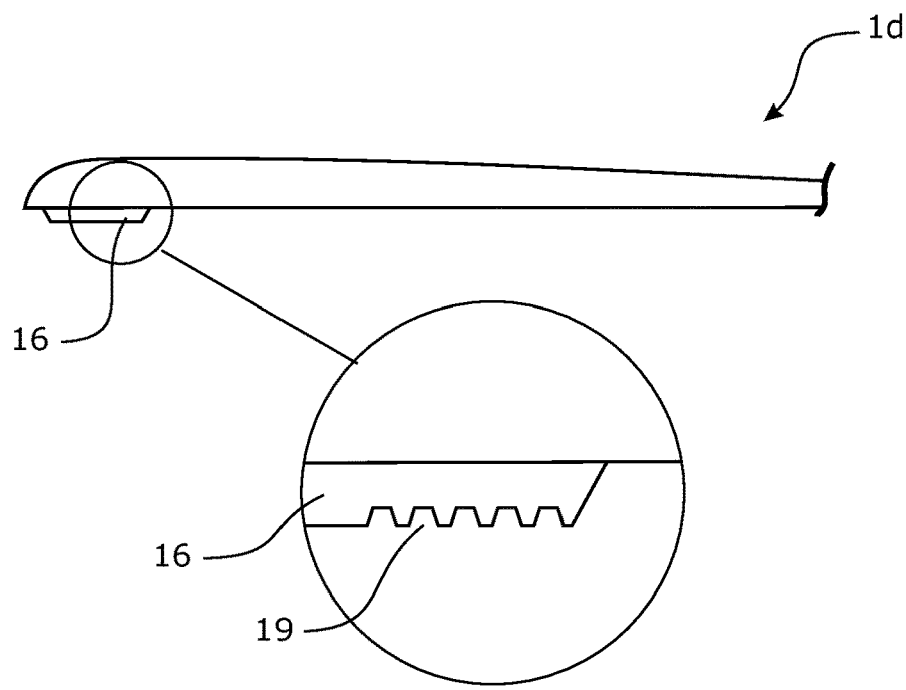
FIG. 14 is a schematic showing a detailed view of a further embodiment of the roofing, cladding, or siding module.

In one embodiment, as shown in FIG. 14, the projections may further comprise surface features 19, such as surface roughness, on one or more surfaces, preferably a bottom surface. The features increase the surface area of the surface, to increase the peel strength and/or bond strength of the projection to the upper surface of the underlapping tile, to which the projection is adhered to.

Examples of surface features include corrugations, serrations, projections, ribs, nodes, surface roughness, etc.

The shape and configuration of the ribs may be selected to provide different attachment properties at different regions of the rib, e.g., a planar, bottom surface of the rib may provide different resistance against shear and/or peel compared to lateral faces of the rib.

Other surfaces of the module may also or alternatively comprise surface features to increase the bond strength between adhered surfaces. For example, the top surface of the underlapping region of the module may comprise surface features to increase the peel and/or bond strength between the top surface and the under surface of the overlapping module. The module may further comprise one or more continuous or discontinuous strips of adhesive 25 on the top surface of the underlapping region of the module (optionally which may be exposed upon removal of a release sheet), configured to contact the projections on the under surface of the exposed region of an adjacent or overlapping module when installed. Additionally or alternatively, adhesive may be provided on a bottom surface of the module (e.g., the bottom surface of the projections, if provided) to be adhered to a top surface of an underlapping module during installation.

Figure 16:
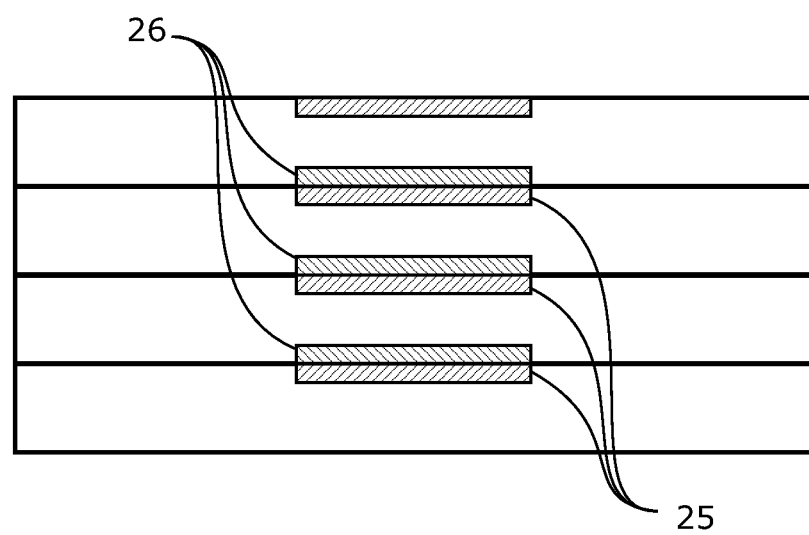
FIG. 16 shows an embodiment of the roofing, cladding, or siding modules, comprising adhesive and release sheets, arranged in a stack.

In some embodiments, for example as shown in FIG. 16, the release sheet 26 may be integrally molded or otherwise formed with or incorporated into the module. Prior to installation, the release sheet 26 may contact the adhesive region 25 of an adjacent module. During installation, the two modules may be separated to expose the adhesive on one module, and the release sheet can remain on the other module. In this way, the modules may be provided and/or transported in stacks of two or more modules.

Alternatively, adhesive may be applied to the projections/ribs and/or to the top of the underlapping region of the module on-site.

In the preferred embodiment, the module comprises a plurality of formed surfaces 9, wherein each of the formed surfaces comprises three-dimensional surface features, as shown in FIG. 1. In this embodiment, each formed surface is a molded segment along the length of the module. For reference, we have defined the length of the foot edge 5 as the length of the module, and the distance between the foot edge 5 and the head edge 4 as the width of the module.

Each formed surface 9 may resemble an individual tile, shingle, slate or shake. Alternatively, each formed surface may resemble a set of tiles, shingles, slates or shakes. Each formed surface 9 comprises an underlapping region 2 and an exposed region 3, wherein the underlapping region is adapted to be substantially covered by the exposed region of an adjacent or overlapping module when installed on a building surface.

The module 1 may therefore be installed with the row of formed surfaces 9 simulating a row of tiles, shingles, slates, shakes, etc.

Figure 6A:
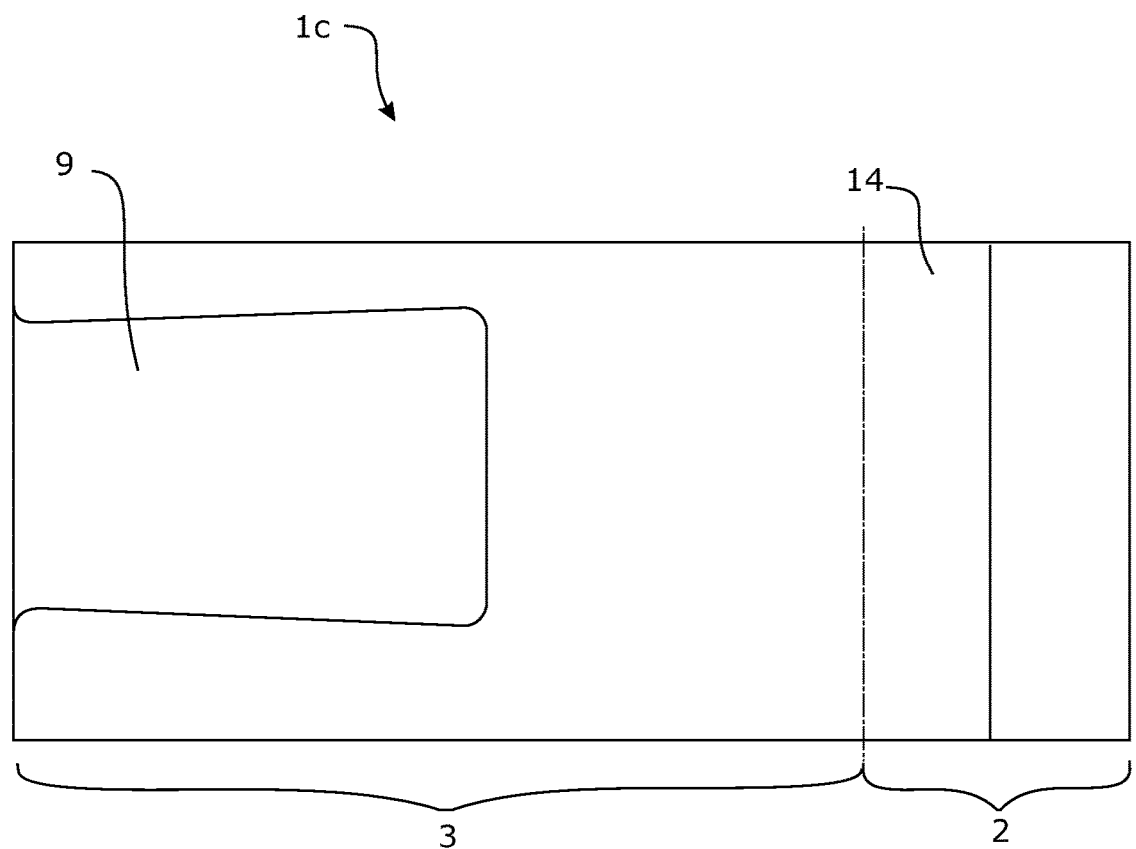
FIGS. 6*a* and 6*b* are top and partial cross-sectional views respectively of a third embodiment of the roofing, cladding, or siding module of the present invention.
Figure 6B:
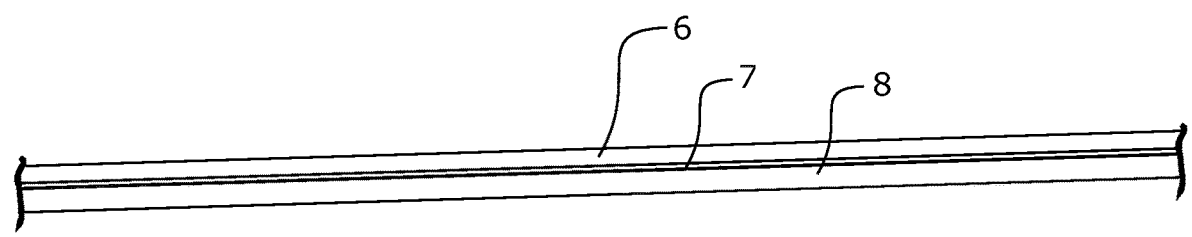

Alternatively, the module may be subsequently sectioned (or divided or partitioned) to provide a plurality of smaller module sections for installation onto the building surface. The smaller module sections may each contain a single formed surface 9 simulating an individual tile, shingle, slate, shake, etc. Alternatively, the smaller module sections may resemble a set of tiles, shingles, slates or shakes. Examples of these smaller module sections are shown in FIGS. 3 and 6. Alternatively, each smaller module section may contain a plurality of formed surfaces.

In one embodiment, each formed surface 9 is molded by an individual die or mold of a continuous forming machine. Where there are a plurality of formed surfaces 9 in the module, all the formed surfaces are preferably joined or laminated to each other without weld lines, attachments (such as gluing, etc) or injection molding points. Use of the term "joined" in this context is not intended to require that each of the formed surfaces were ever separated, i.e., the formed surfaces may be integrally formed together in situ during the manufacturing/molding process.

The preferred method of forming a module having a plurality of formed surfaces joined together without weld lines, attachments or injection molding points is described as follows, and with reference to FIG. 9. The continuous forming machine 11 is fed a feed material able to assume and retain a form after being molded between a first forming surface 12 and a second forming surface 13. At least the first forming surface 12 comprises a plurality of die faces 21 provided in sequence, configured to mold the three-dimensional surface features onto the module. That is, each formed surface 12 along the module is molded by one die face. It should be understood that, while the drawings show the first forming surface 12 on the top and the second forming surface 13 on the bottom of the continuous forming machine, the relative positions of the two surfaces may be reversed. Accordingly, in some embodiments, the module may be molded upside down (i.e., the bottom surface is molded with the surface features, which when installed, becomes the top/exposed surface of the module).

In some embodiments, each die face is (at least slightly) different from the adjacent die face, in order to produce a module with formed surfaces 9 which appear (at least slightly) different from at least the adjacent formed surfaces. When installed, the module-clad surface may therefore more closely resemble a surface covered with individual asphalt shingles, slate, shingles, shakes, concrete tiles, stone chips, weatherboard, etc. Further, it would be desirable to produce modules, each having a different arrangement of formed surfaces, to increase the variation in appearance when a plurality of modules are installed overlapping each other. While this may be achieved by replacing or swapping individual die faces along the first forming surface 12, it would be desirable to be able to produce different modules in a batch or continuous forming process. Alternatively, the die faces may be the same as each other in order for formed surface 9 to be formed which are substantially identical or matching of each other.

Accordingly, in the preferred embodiment, the number of die faces is offset from the number of formed surfaces in each module to be formed. That is, there are more or fewer die faces compared to the number of formed surfaces in each module. Alternatively, the number of die faces may match the number of surfaces to be formed on a module or along a length of a layer—thereby contributing to the matched or substantially identical nature of the formed surface (e.g. where copper tiles or tiles which are of matching resemblance are to be provided as a part of a module).

This means that the process may continuously produce a set of modules, in which each module has a series of formed surfaces which are arranged in a non-identical manner to the series of formed surfaces on at least the previously formed module and the next module to be formed. More preferably, each module has a series of formed surfaces which are arranged in a non-identical manner to the series of formed surfaces on a plurality of previously formed modules and a plurality of module to be subsequently formed.

For example, to form the module of FIG. 1 which has seven formed surfaces 9, there are preferably at least eight die faces 21 along at least the first forming surface 12. The last die face therefore molds the first formed surface of the next module in this continuous forming process. Accordingly, this module and the next will have a different arrangement of formed surfaces.

It will be appreciated that the number of different permutations that may be obtained will depend on the number of die faces compared to formed surfaces.

Alternatively, there may be fewer die faces 21 compared to the number of formed surfaces in each module to be formed. For example, if there is one less die face compared to formed surfaces, the first and last formed surfaces along a single module will be identical. Nevertheless, each module will have a different sequence of formed surfaces compared to the previously formed and subsequently formed modules.

As discussed above, each formed surface preferably has three dimensional surface features which are different from the surface features of at least the adjacent formed surfaces. More preferably, the die faces are configured such that each of the formed surfaces within the module has three dimensional surface features which are different from the surface features of all other formed surface within the module.

Additionally, the sequence of formed surfaces in each module may be further varied by swapping a die face with another die face along the first forming surface.

Additionally or alternatively, each die face may be rotated in place to provide for a different orientation of three dimensional surface features on the formed surface to be molded, and hence a variation in the overall appearance of the formed surface.

In other embodiments, the die faces may be the same, so as to produce similar or identical formed surfaces. For example, this embodiment may be used to produce modules which resemble ceramic tiles or metallic tiles such as copper tiles. Further, in some embodiments, the die faces may not mould three-dimensional surface features into the module, but may simply serve to divide the module into formed surfaces to resemble individual tiles.

While the preceding description relates to the modules being produced as discontinuous units via the batch or continuous forming process (i.e., each feed input into the continuous forming machine produces a single length of module), an alternative method may involve producing a long length of precursor which is subsequently sectioned to obtain multiple modules. In this case, the precursor will comprise multiple repeating sequences of formed surfaces. In order to produce modules with different sequences of formed surfaces, the precursor is not sectioned at the intersections where the sequences repeat.

For example, to obtain the module of FIG. 1, the precursor may have multiple repeating sequences of eight formed surfaces. The precursor is sectioned to obtain modules containing only seven formed surfaces. This sectioning may occur during or after the molding process.

It will be appreciated that regardless of whether the modules are produced as discontinuous units or as a continuous precursor which is subsequently sectioned, in embodiments where the modules are formed to have different arrangements of formed surfaces, the important feature is that the number of die faces 21 provided in sequence on the first forming surface 12 is offset from the number of formed surfaces 9 in each module.

In some embodiments, the module may be post-treated once formed, for example by shaping, folding, coloring, corrugating, adding surface treatment(s) (e.g. biocides), perforating, laminating, coating, etc.

Figure 15A:
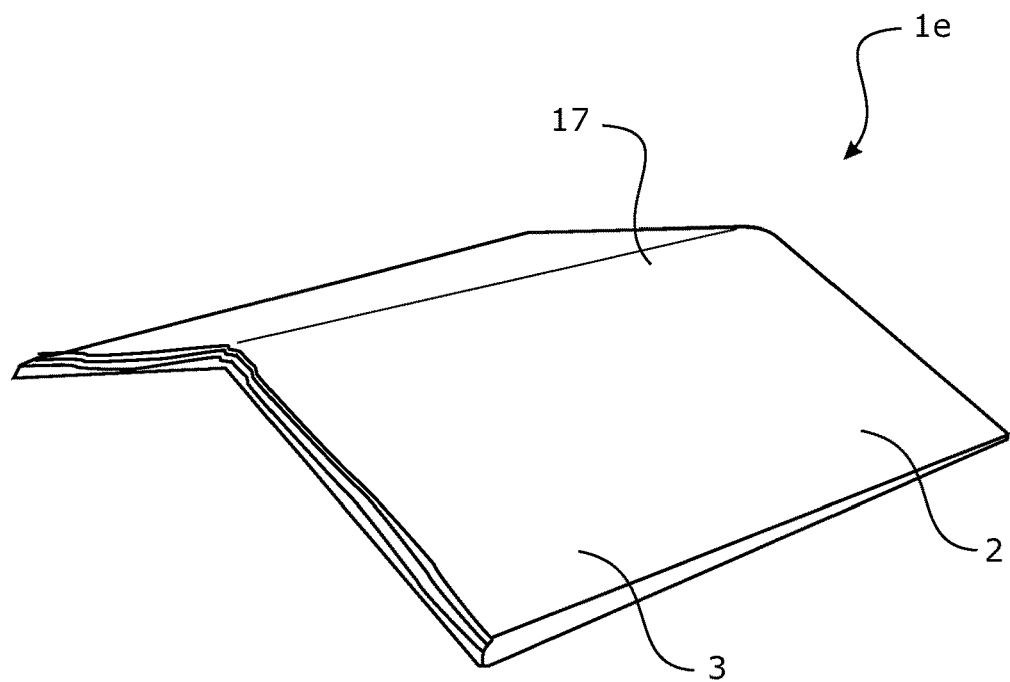
FIG. 15 shows examples of modules shaped after forming into ridge and barge tiles.
Figure 15B:
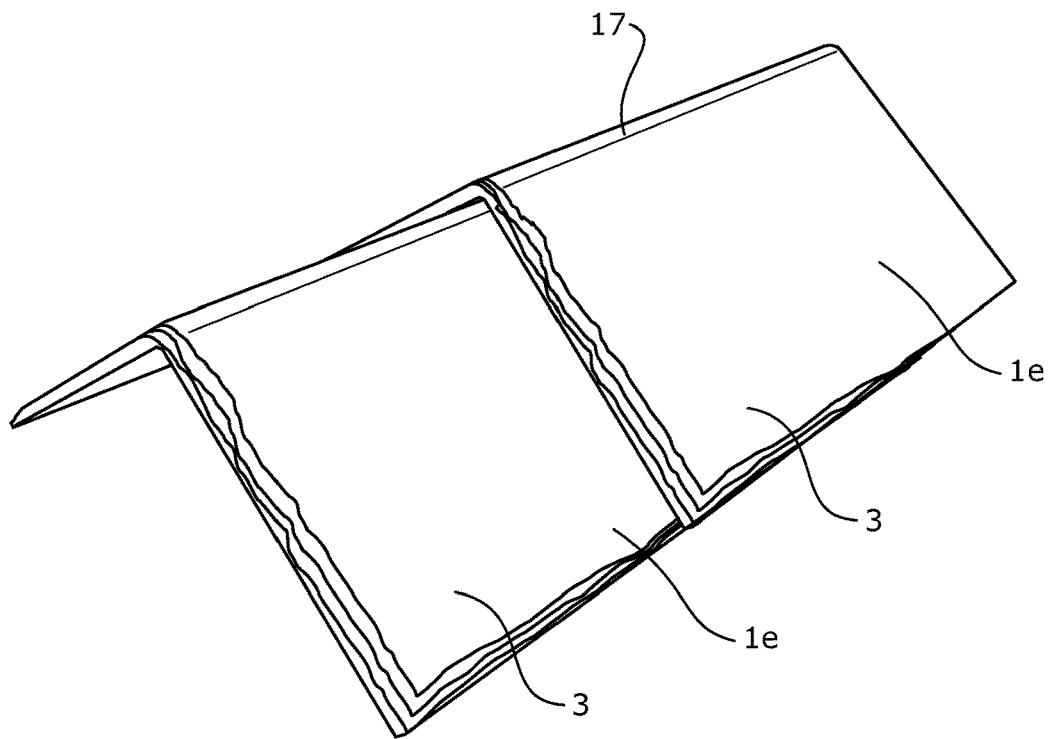
Figure 15C:
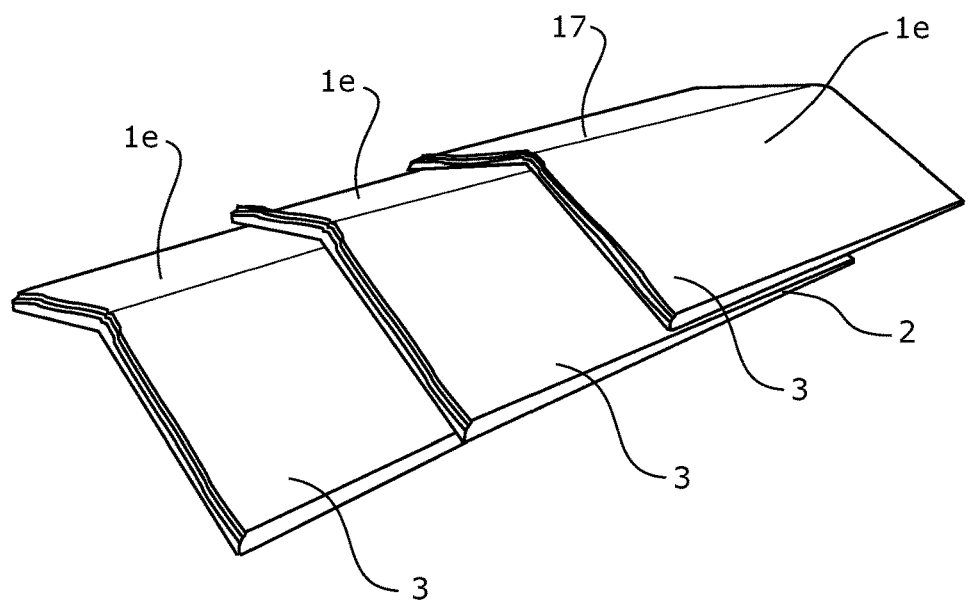

In some embodiments, the module is shaped and/or cut and/or folded, once formed, to produce a ridge tile, a hip tile, a barge tile, an apex tile or other shaped/angled tiles, such as corrugated tiles. Examples of folded modules are shown in FIGS. 15*a*, 15*b* and 15*c*. It will be appreciated that the angle of the fold depends on the application.

In some embodiments, the region to be folded or shaped may be heated or re-heated in order to be bent or folded into shape after the module has been formed. In some embodiments, the region to be folded or shaped 17 may comprise a reinforcing layer to increase the toughness and/or durability of this region.

As shown in FIGS. 15*b* and 15*c*, the folded/shaped modules may, be arranged in any suitable overlapping arrangement (over similar folded/shaped modules or other unfolded modules) for or when installing onto the building surface.

Methods for coloring the module, preferably to resemble another type of natural or manufactured material as discussed above, will now be described in more detail. It should be appreciated that the following methods of coloring the module are not specific to the preferred forms of the module as described herein. For example, the coloring methods may be applied to modules comprising only one layer of polymer, etc. Preferable, however, at least the top surface of the exposed portion of the module is colored.

For brevity, the following description will refer to a "precursor", being the precursor to the final molded module. The precursor may therefore refer to a single layer, or to the layered precursor just prior to molding the layers together into the final product.

In one embodiment, a colored material is added to the one or more layers, before or while the layer is formed (whether by extrusion, injection molding or other forming methods as described above).

In another embodiment, the colored material is added onto the module after it has been formed/molded.

Additionally or alternatively, the colored material may be added onto at least a portion of the top surface of a precursor. That is, the colored material is applied before and/or during the final molding process.

Figure 10:
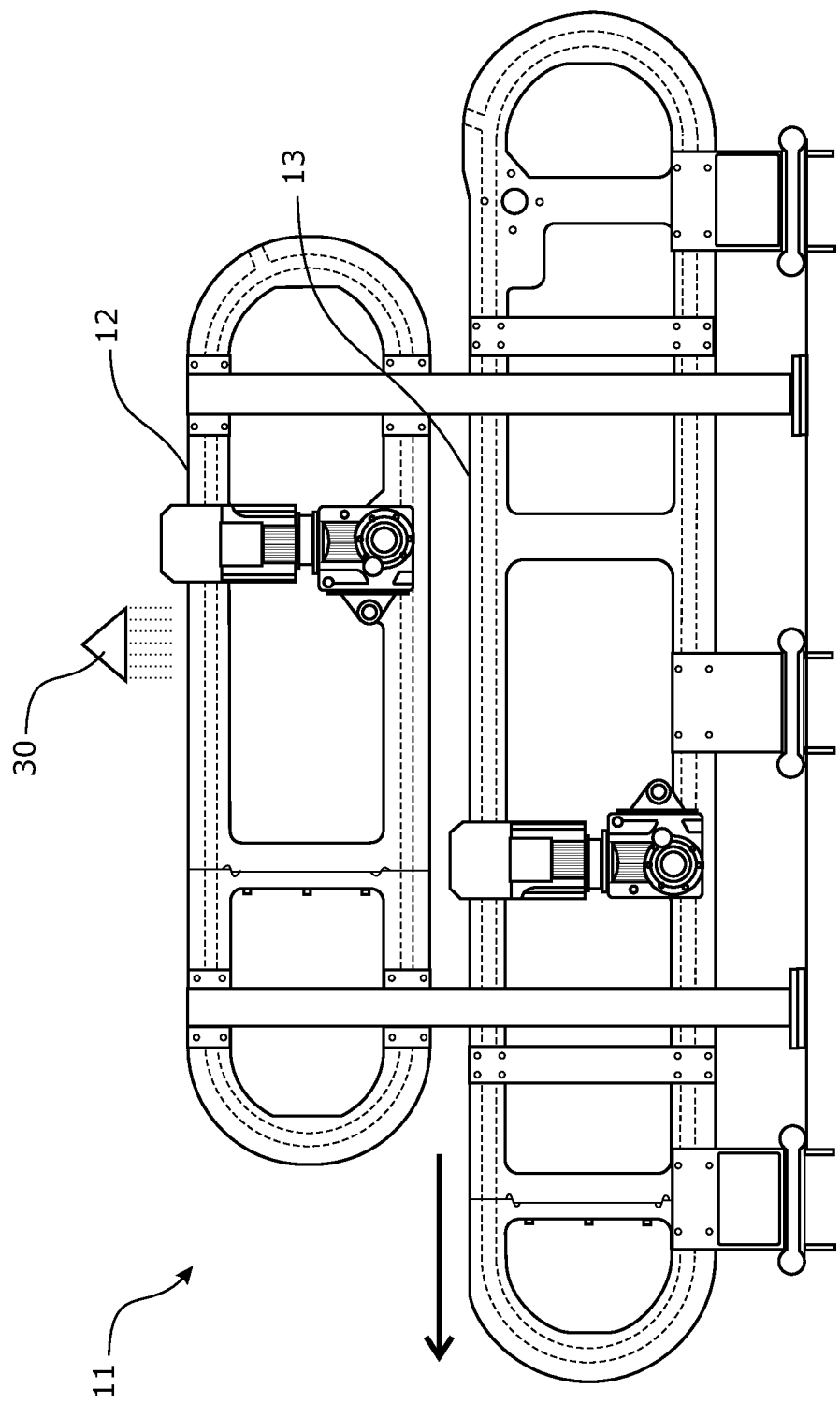
FIG. 10 shows a system for coloring a roofing, cladding, or siding module according to one preferred embodiment of the present invention.

The colored material may be one or more dyes or pigments or colored particles which may be used to add surface color and/or decoration and/or texture to the module. The colored material may be transparent, translucent or opaque, and may comprise multiple components of different types of coloring or colored agents. The colored material may be applied to a precursor or module that has already been colored during the forming process. One embodiment is shown in FIG. 10, in which the precursor is molded between a first forming surface 12 and a second forming surface 13. The colored material is applied at 30 to at least a portion of one of the forming surfaces. Subsequently, the colored material is transferred to the precursor during the molding step, when the precursor is formed between the first and second forming surfaces.

As shown schematically in FIG. 10, the colored material may be sprayed or otherwise applied onto the first forming surface 12 and/or second forming surface 13. In some embodiments, the specific gravity of the colored material is preferably greater than 1. The colored material may be applied directly or indirectly to the precursor and/or the forming surface by one or more of stamping, injecting, embossing, spraying, rolling, feeding, brushing, melting, immersing, dipping, sprinkling, depositing, by drawing or suctioning the colored material onto the precursor and/or forming surface using a vacuum system, etc. Alternatively, the first and/or second forming surface may comprise a printer head, etc., for depositing the colored material onto the precursor during the molding step.

In addition, or alternatively, colored material may be applied (whether directly or indirectly) to a surface of a layer or layer precursor or a surface of a die face or a surface of the formed module, using a vacuum system. For example, in one embodiment a colored material may be applied to a top surface of an upper layer to be used in forming a module, and a vacuum system may remove at least some of the applied colored material. The removal of the colored material may be removal from pre-defined areas of the surface upon which the colored material has been applied.

In the embodiment where the precursor is molded in a continuous forming process between first and second forming surfaces, and the first forming surface comprises at least one die face configured to mold surface features onto at least a portion of a top surface of the module, the colored material is preferably applied to at least a portion of the die face(s) prior to the molding step. The colored material is therefore subsequently stamped, injected, embossed or otherwise applied onto or into a portion of formed surface(s) during the molding step.

The application of colored material onto the different die faces may be consistent or different. For example, the amount of colored material applied and/or the areas on which the colored material is applied may be different for each die face, in order to produce a module with color variations throughout the different formed surfaces, so that they more closely simulate individual tiles, shingles, etc.

In another embodiment, the colored material may comprise a plurality of components having different melt flow indices/viscosities, so as to produce a visual effect such as a tortoiseshell coloring effect. In some embodiments, one or more components of the colored material may be a solid that does not melt (at least in the range of temperatures that the colored material undergoes), i.e., the component(s) may not have a melt flow index as such.

In the preferred embodiment where at least a portion of the module comprises a plurality of layers, the colored material is preferably applied to at least a portion of the upper surface of the top-most layer prior to, or during the step of joining or lamination of the layers to form the module.

In another embodiment, the precursor is extruded prior to molding, and the colored material is applied at 35 to a portion of the upper surface of the layer as the layer emerges from the extruder. This is schematically shown in FIG. 11.

Figure 11:
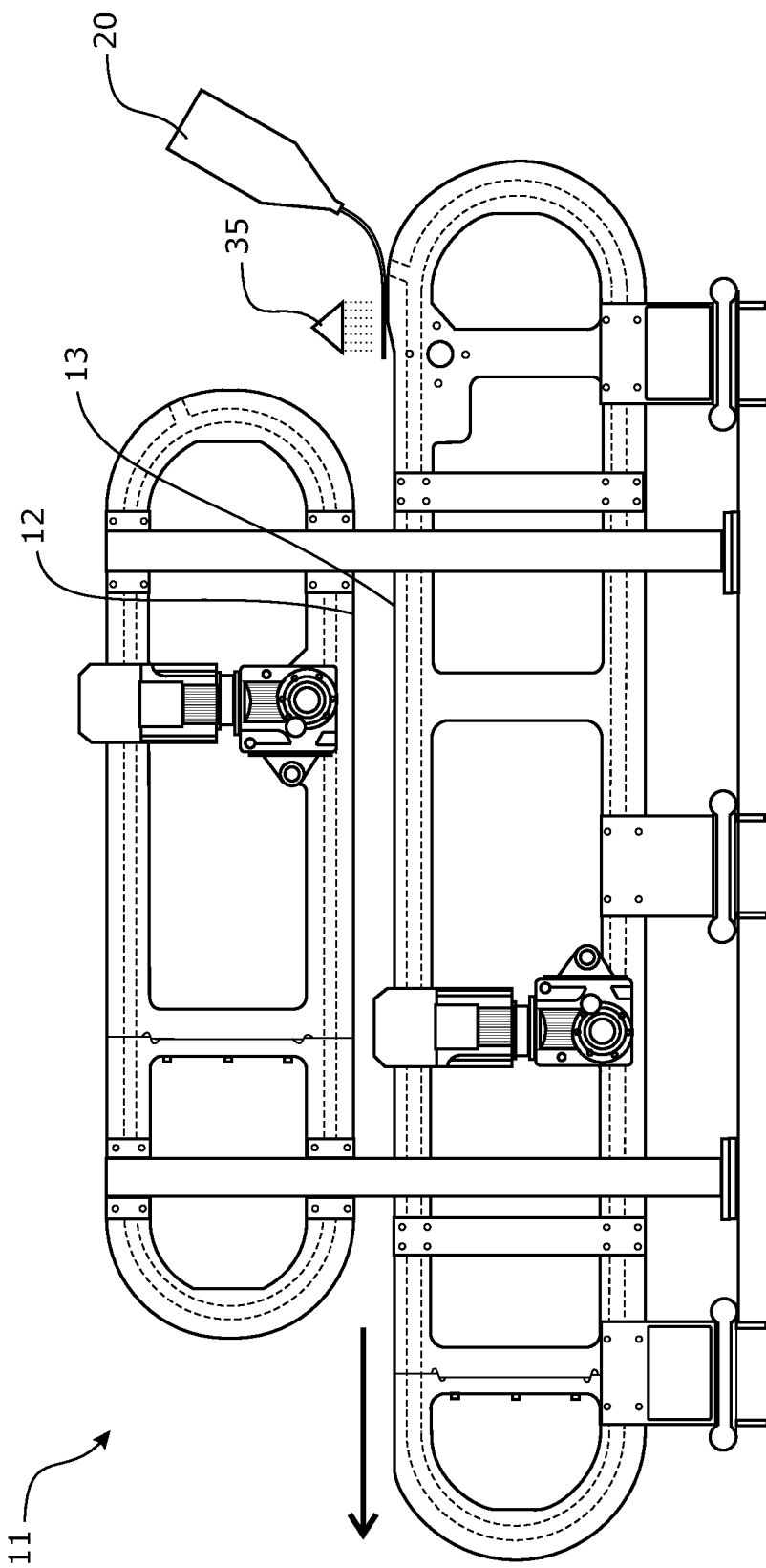
FIG. 11 shows a second embodiment of a system for coloring a roofing, cladding, or siding module.

It will be appreciated that both the coloring methods illustrated in FIGS. 10 and 11 may be employed, such that the precursor may be colored after extrusion, and once again during the molding step.

Figure 12:
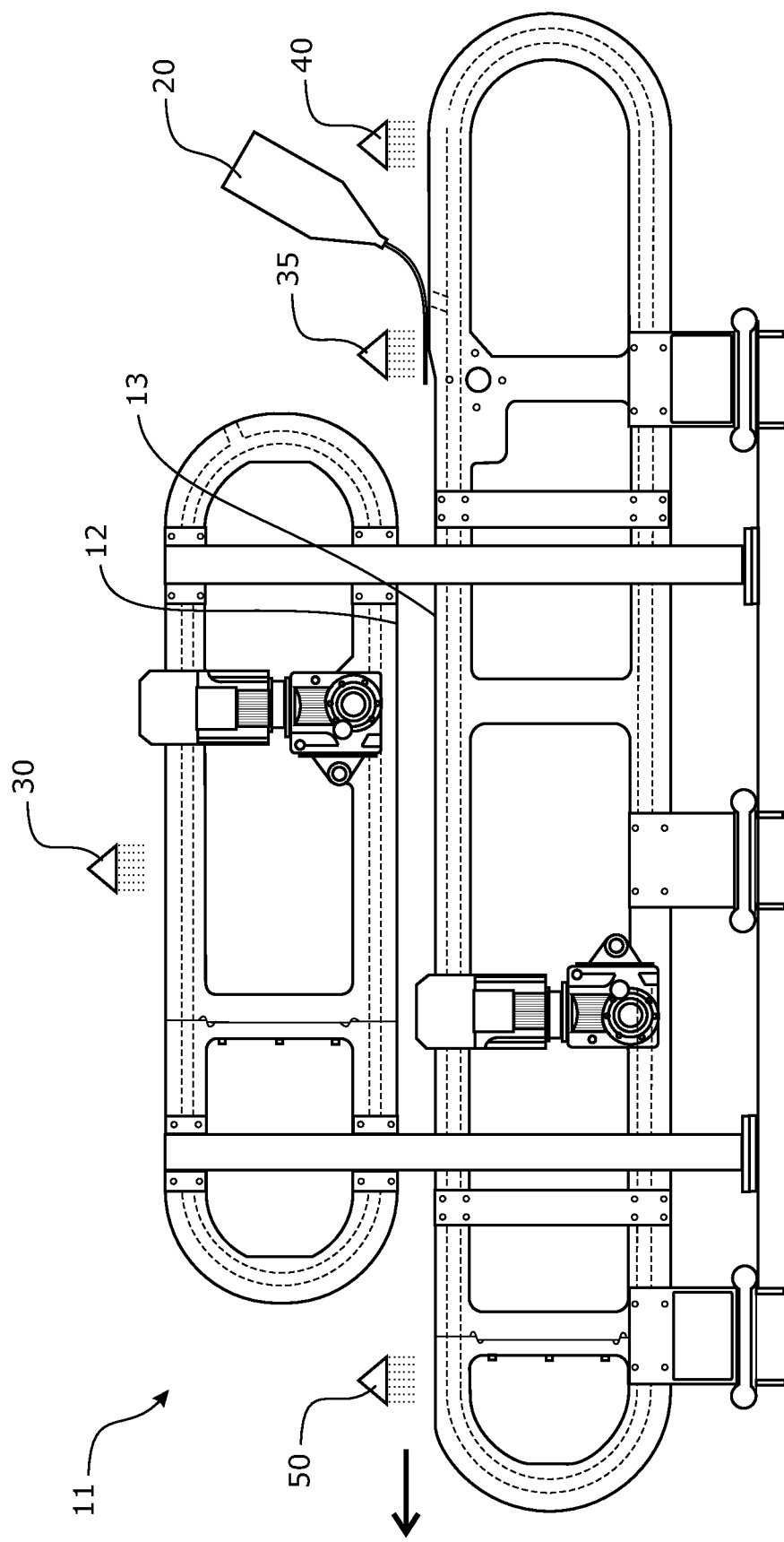
FIG. 12 shows a third embodiment of a system for coloring a roofing, cladding, or siding module.
Figure 13A:
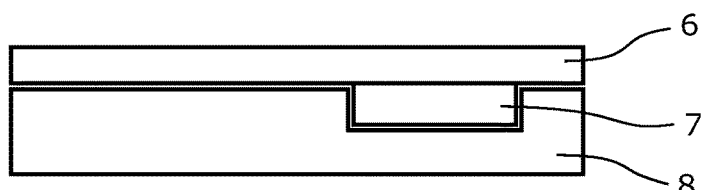
FIG. 13*a*-13*h* show various arrangements of a three-layered roofing, cladding, or siding module.
Figure 13B:
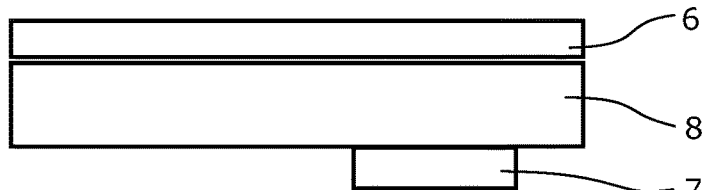
Figure 13C:
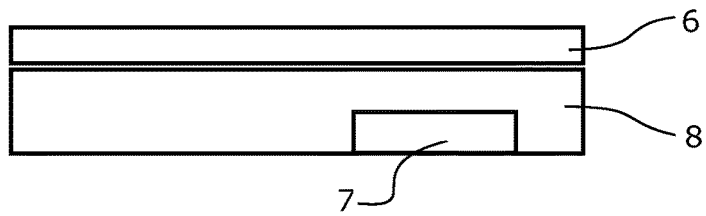
Figure 13D:
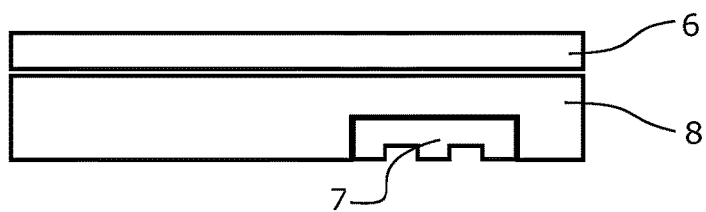
Figure 13E:
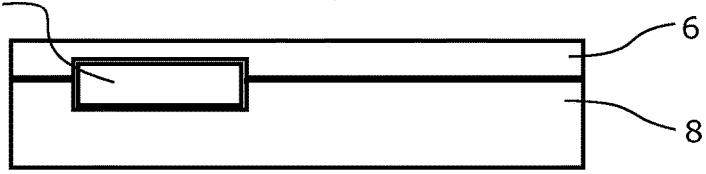
Figure 13F:
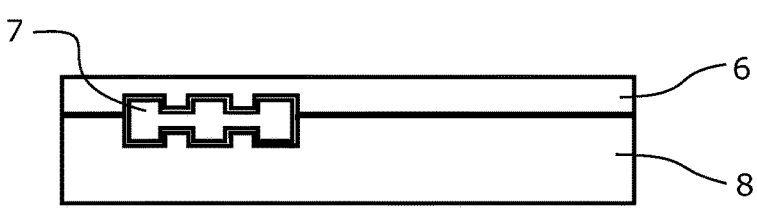
Figure 13G:
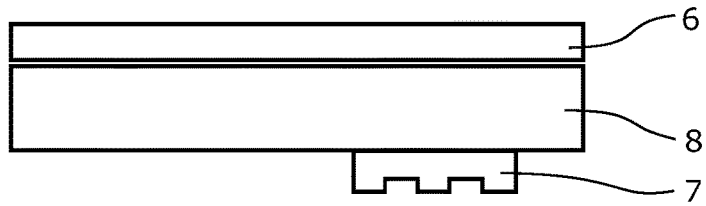
Figure 13H:
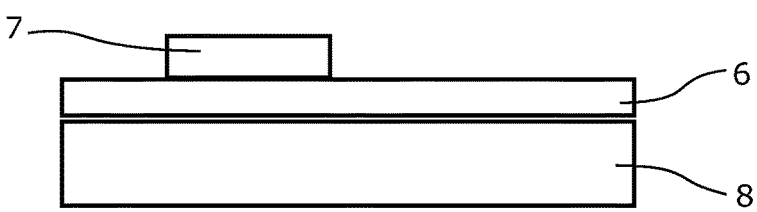

For example, FIG. 12 shows additional or alternative locations where the colored material may be applied. The colored material may be applied at 40, before a layer is extruded, or onto a layer which may be later formed with other extruded layers. Additionally or alternatively, the colored material may be applied at 50, after the module has been formed. The colored material preferably comprises a powder and/or a fluid capable of being dispersed upon at least the or a portion of the top surface of the exposed region, whether the application is direct or indirect to the surface, or whether a die face is used to convey the colored material to the surface.

In one example, the colored material may be or may comprise charged particles. The charged particles may be configured to be attracted to the die face, or directly onto the precursor. Alternatively, the charged particles may be configured to be ejected from a source of such charged particles onto the precursor.

In another embodiment, the colored material may be or may comprise an adhesive for attaching the colored material to the precursor.

In any case, the colored material may be applied through a stencil and/or a mask (not shown), to selectively color one or more portions of the top surface of the precursor. Accordingly, there may be more than one color application steps, in which the same or a different colored material may be applied through the same or a different stencil, or to another portion of the top surface of the precursor.

Layering the application of colored material like this may produce variations in color or surface patterning which better emulate the simulated material.

The foregoing description of the invention includes preferred forms thereof. Modifications may be made thereto without departing from the scope of the invention.

The invention claimed is:

1. A roofing, cladding, or siding module, comprising:
an underlapping region extending from a head edge of the module and an exposed region extending from a foot edge of the module, the length of the foot edge defining the length of the module,
wherein the underlapping region is adapted to be substantially covered by the exposed region of an adjacent or overlapping module when installed on a building surface,
wherein the module is formed of at least one layer of extruded material, wherein the layer so formed comprises:
at least 40% w/w filler and reinforcement or at least 40% w/w reinforcement, and one or more polymer(s),
wherein the reinforcement comprises one or more non-conductive natural or synthetic fibres, and wherein the layer so formed comprises at least 6% w/w of said one or more non-conductive natural or synthetic fibres, and wherein the fibres are aligned along the length of the module; and wherein the module comprises a plurality of formed surfaces molded along the length of the module, each of the formed surfaces comprising at least one three-dimensional surface feature.

2. The module as claimed in claim 1, wherein the layer comprises 60% to 95% w/w filler and/or reinforcement.

3. The module as claimed in claim 1, wherein the layer comprises at least 5% w/w reinforcement.

4. The module as claimed in claim 1, wherein the layer comprises 5% to 30% w/w reinforcement.

5. The module as claimed in claim 1, wherein the layer comprises one or more of the following polymers:
   a) polystyrene (GPPS),
   b) polyethylene terephthalate (PET),
   c) polyester methacrylate (PEM),
   d) high impact polystyrene (HIPS),
   e) acrylonitrile butadiene styrene (ABS),
   f) polyvinyl chloride (PVC),
   g) polyurethanes (PU),
   h) polyethylene (PE) including homopolymer, copolymer, block copolymer and terpolymer forms,
   i) polylactic acid (PLA),
   j) nylon (PA),
   k) acrylics (PMMA),
   l) high density polyethylene (HDPE),
   m) low density polyethylene (LDPE),
   n) linear low density polyethylene (LLDPE),
   o) medium density polyethylene (MDPE),
   p) cross linked polyethylene (PEX),
   q) thermoplastic elastomer (TPE),
   r) thermoplastic polyolefin (TPO),
   s) thermoplastic rubber (TPR), t) polypropylene (PP), including homopolymer and copolymer forms,
u) polybutylene terephthalate (PBT),
v) styrene-acrylonitrile resin (SAN),
w) ethylene tetrafluoroethylene (ETFE),
x) vinyl,
y) methacrylate copolymers,
z) foamed polymer.

6. The module as claimed in claim 1, wherein the filler comprises one or more of the following:
a) talc,
b) calcium carbonate,
c) mica,
d) silica,
e) kaolin,
f) calcium sulphate,
g) magnesium hydroxide,
h) stabilizers,
i) dolomite.

7. The module as claimed in claim 1, wherein the reinforcement comprises one or more of the following:
glass fibres,
glass beads,
glass flakes,
flax,
cellulose,
wood fibres,
wood flour,
cotton,
sawdust,
inorganic fibres,
polymer fibres,
polymer scrim,
polymer knit,
polymer weave,
aramids,
ceramics.

8. The module as claimed in claim 1, wherein at least a portion of a top surface of the exposed region comprises at least one of the formed surfaces, whether as surface relief or surface texturing, optionally wherein said portion comprises surface features resembling one of:
a) asphalt shingle,
b) slate,
c) shingles,
d) shakes,
e) concrete tiles,
f) stone chips,
g) weatherboard,
h) thatch,
i) stone,
j) woodgrain,
k) metal.

9. The module as claimed in claim 8, wherein each of the formed surfaces comprises said surface features, and wherein the formed surfaces are joined without weld lines, attachments or injection molding points, optionally wherein each of the formed surfaces resembles an individual tile or shingle or slate or shake within the module.

10. The module as claimed in claim 1, wherein said layer so formed of a said extruded material is provided as a base or bottom layer of the module, and the module further comprises one or more additional upper layers provided as further layers upon said base or bottom layer, optionally wherein said one or more upper layer(s) is formed of an extruded material, said one or more upper layer(s) comprising a different weight percentage of filler and/or reinforcement relative to the base or bottom layer.

11. The module as claimed in claim 10, wherein the percentages and/or material of the polymer(s) and/or filler and/or reinforcement are the same in each layer.

12. The module as claimed in claim 1, wherein said at least one layer so formed has a coefficient of thermal expansion of less than $30 \cdot 10^{-6}$ m/(m K), and optionally wherein said at least one layer so formed is provided as a base or bottom layer of said module.

13. The module as claimed in claim 1, wherein at least a portion of the module comprises a top layer, a base or bottom layer, and an intermediate layer between the top and base or bottom layers.

14. The module as claimed in claim 1, wherein a layer so formed extends across at least a part of the width and/or at least a part of the length of the module to provide for a variation to one or more properties to the module so formed by the at least one layer, the properties selected from one or more of:
a) thickness,
b) surface area
c) tensile strength
d) shear strength
e) resilience
f) elasticity
g) flexibility
h) toughness
i) fire resistance
j) water resistance
k) continuity or uniformity
l) impact resistance
m) resistance to pull through
n) fixing capability
o) chemical resistance
p) puncture resistance
q) content of filler and/or reinforcement
r) concentration of filler and/or reinforcement
s) color
t) microbial resistance
u) temperature resistance
v) light/heat absorption/reflectivity,
w) thermal transfer.

15. The module as claimed in claim 1, wherein the module is post-treated after being formed, optionally comprising one or more of:
shaping,
folding,
coloring,
corrugating,
adding surface treatment(s),
perforating,
laminating,
coating.

16. The module as claimed in claim 1, wherein an under surface of at least the exposed region of the module surface comprises a plurality of projections, optionally wherein the projections provide surfaces for one or more of:
adhering the exposed region of the module to the top surface of the underlapping region of an adjacent or overlapping module when installed,
providing reinforcement for the module.

17. The module as claimed in claim 1, wherein the length of the module is at least 0.5 m.

18. The module as claimed in claim 1, wherein said at least one layer so formed has a coefficient of thermal expansion of less than about $165 \cdot 10^{-6}$ m/(m K), and optionally wherein said at least one layer so formed is provided as a base or bottom layer of said module.

19. The module as claimed in claim 1, wherein the reinforcement comprises or consists of glass fibres, and wherein the glass fibres are aligned along the length of the module.

20. The module as claimed in claim 19, wherein the layer so formed comprises at least 10% w/w of said glass fibres.

21. The module as claimed in claim 19, wherein the glass fibres prior to extrusion are between about 0.5 and 5 mm in length.

22. The module as claimed in claim 1, wherein the layer so formed comprises at least 10% w/w of said one or more non-conductive natural or synthetic fibres.

23. A roofing, cladding, or siding module, comprising:
an underlapping region extending from a head edge of the module and an exposed region extending from a foot edge of the module, the length of the foot edge defining the length of the module,
wherein the underlapping region is adapted to be substantially covered by the exposed region of an adjacent or overlapping module when installed on a building surface,
wherein the module is formed of at least one layer of extruded material, wherein the layer so formed comprises:
  at least 40% w/w filler and/or reinforcement, and
  one or more polymer(s),
wherein at least the or a portion of a top surface of the exposed region is colored or treated in a manner so as to yield a visually observable color, by applying a colored material onto at least a portion of the top surface of a top layer, either before or after one or more layers are joined together; and wherein the module comprises a plurality of formed surfaces molded along the length of the module, each of the formed surfaces comprising at least one three-dimensional surface feature.

24. The module as claimed in claim 23, wherein the module is formed by molding, and at least a portion of a top surface of the module is colored and/or decorated and/or textured by applying a colored material onto at least a portion of the top surface of a precursor of the module, wherein the colored material is applied before and/or during the molding process.

25. The module as claimed in claim 23, wherein the colored material once applied to at least a portion of the top surface forms at least a further additional layer of material upon the module.

26. A roofing, cladding, or siding module, comprising:
an underlapping region extending from a head edge of the module and an exposed region extending from a foot edge of the module, the length of the foot edge defining the length of the module,
wherein the underlapping region is adapted to be substantially covered by the exposed region of an adjacent or overlapping module when installed on a building surface,
wherein the module is formed of at least one layer of extruded material, wherein the layer so formed comprises:
at least 40% w/w filler and reinforcement or at least 40% w/w reinforcement, and one or more polymer(s), the one or more polymer(s) comprising a foamed polymer,
wherein the reinforcement comprises one or more non-conductive natural or synthetic fibres, and wherein the layer so formed comprises at least 6% w/w of said one or more non-conductive natural or synthetic fibres, and wherein the fibres are aligned along the length of the module; and wherein the module comprises a plurality of formed surfaces molded along the length of the module, each of the formed surfaces comprising at least one three-dimensional surface feature.

* * * * *